United States Patent
Kang et al.

(10) Patent No.: US 12,382,451 B2
(45) Date of Patent: Aug. 5, 2025

(54) METHOD FOR TRANSMITTING/RECEIVING PHYSICAL DOWNLINK SHARED CHANNEL IN WIRELESS COMMUNICATION SYSTEM, AND DEVICE THEREFOR

(71) Applicant: LG ELECTRONICS INC., Seoul (KR)

(72) Inventors: Jiwon Kang, Seoul (KR); Hyungtae Kim, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 573 days.

(21) Appl. No.: 17/630,438

(22) PCT Filed: Aug. 18, 2020

(86) PCT No.: PCT/KR2020/010963
§ 371 (c)(1),
(2) Date: Jan. 26, 2022

(87) PCT Pub. No.: WO2021/029754
PCT Pub. Date: Feb. 18, 2021

(65) Prior Publication Data
US 2022/0264615 A1 Aug. 18, 2022

Related U.S. Application Data

(60) Provisional application No. 62/887,612, filed on Aug. 15, 2019.

(51) Int. Cl.
*H04W 72/1273* (2023.01)
*H04B 7/0408* (2017.01)
(Continued)

(52) U.S. Cl.
CPC ...... *H04W 72/1273* (2013.01); *H04B 7/0408* (2013.01); *H04W 16/28* (2013.01); *H04W 72/23* (2023.01)

(58) Field of Classification Search
CPC . H04W 72/1273; H04W 16/28; H04W 72/23; H04B 7/0408; H04B 7/024;
(Continued)

(56) References Cited

U.S. PATENT DOCUMENTS

2018/0279135 A1 9/2018 Hwang et al.
2018/0343653 A1* 11/2018 Guo ............... H04B 7/088
(Continued)

FOREIGN PATENT DOCUMENTS

KR 10-2019-0088409 A 7/2019

OTHER PUBLICATIONS

Zte, "Consideration on beam management for multi-TRP", May 13-17, 2019, R1-1906244 (From Applicant's IDS) (Year: 2019).*
(Continued)

*Primary Examiner* — Mang Hang Yeung
(74) *Attorney, Agent, or Firm* — BRYAN CAVE LEIGHTON PAISNER LLP

(57) ABSTRACT

Presented in the present specification are a method for transmitting/receiving a physical downlink shared channel in a wireless communication system, and a device therefor. Particularly, a method performed by a terminal comprises the steps of: receiving configuration information about a control resource set (CORESET) of a first group and a
(Continued)

CORESET of a second group; receiving a first physical downlink control channel (PDCCH) from the CORESET of the first group; receiving a first PDSCH on the basis of the first PDCCH; receiving a second PDCCH from the CORESET of the second group; and receiving a second PDSCH on the basis of the second PDCCH, wherein the first PDSCH and/or the second PDSCH can be received, on the basis of being scheduled within a scheduling offset, by using a default CORESET.

15 Claims, 21 Drawing Sheets

(51) Int. Cl.
*H04W 16/28* (2009.01)
*H04W 72/23* (2023.01)

(58) Field of Classification Search
CPC .... H04B 7/0691; H04B 7/0695; H04B 7/088; H04L 5/0023; H04L 5/0044; H04L 5/0053; H04L 5/0094
USPC .......................................... 370/329
See application file for complete search history.

(56) References Cited

U.S. PATENT DOCUMENTS

| | | | |
|---|---|---|---|
| 2020/0044797 A1* | 2/2020 | Guo | H04W 72/51 |
| 2020/0404690 A1* | 12/2020 | Lee | H04L 5/005 |
| 2022/0116183 A1* | 4/2022 | Gao | H04L 1/1812 |
| 2022/0295304 A1* | 9/2022 | Matsumura | H04W 72/1273 |
| 2023/0189261 A1* | 6/2023 | Matsumura | H04W 72/1273 370/329 |

OTHER PUBLICATIONS

Zte, "Considerations on Beam Management for Multi-TRP", R1-1906244, 3GPP TSG RAN WG1 #97, Reno, USA, May 4, 2019, pp. 1-7, Fig. 1.

Huawei, "Summary of AI: 7.2.8.2 Enhancements on Multi-TRP/Panel Transmission of Offline Discussion", R1-1905684, 3GPP TSG RAN WG1 #96b, Xi'an, China, Apr. 9, 2019, p. 32.

Intel Corporation, "On Multi-TRP/Multi-Panel Transmission", R1-1907559, 3GPP TSG RAN WG1 #97, Reno, USA, May 7, 2019, pp. 1-21.

* cited by examiner

【FIG. 1】
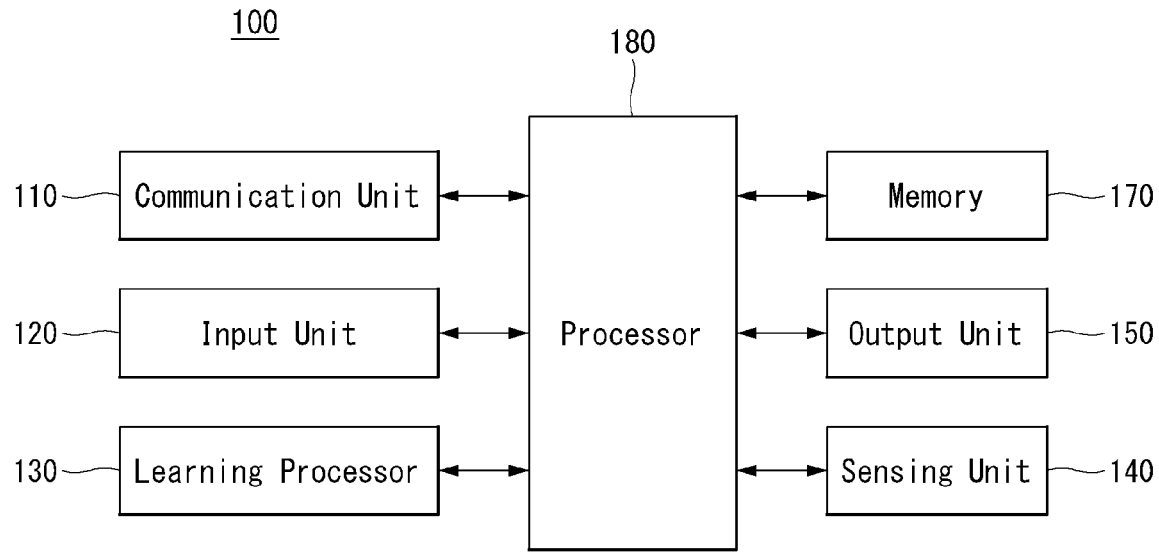
【FIG. 2】
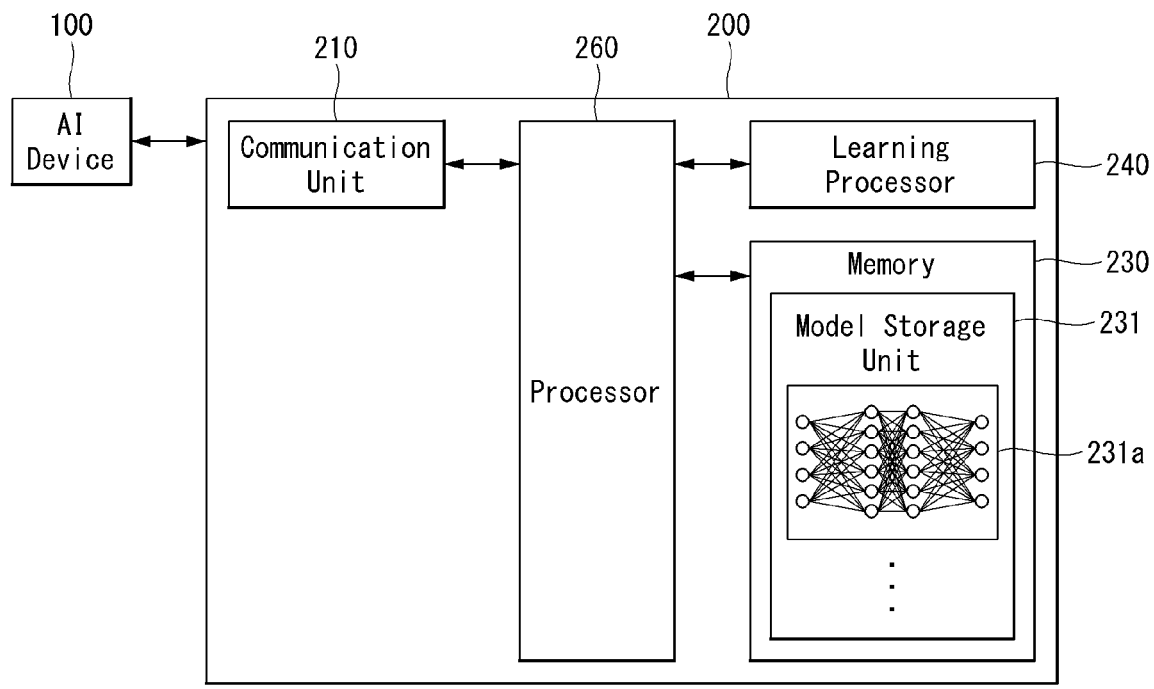

[FIG. 3]
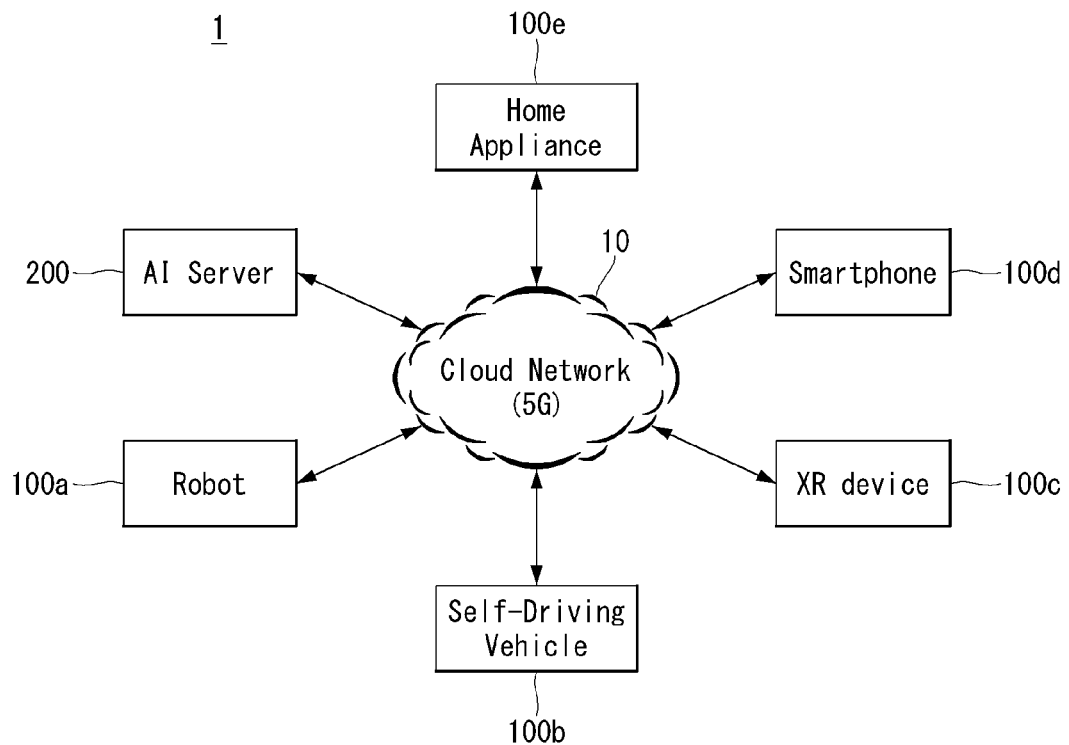

【FIG. 4】
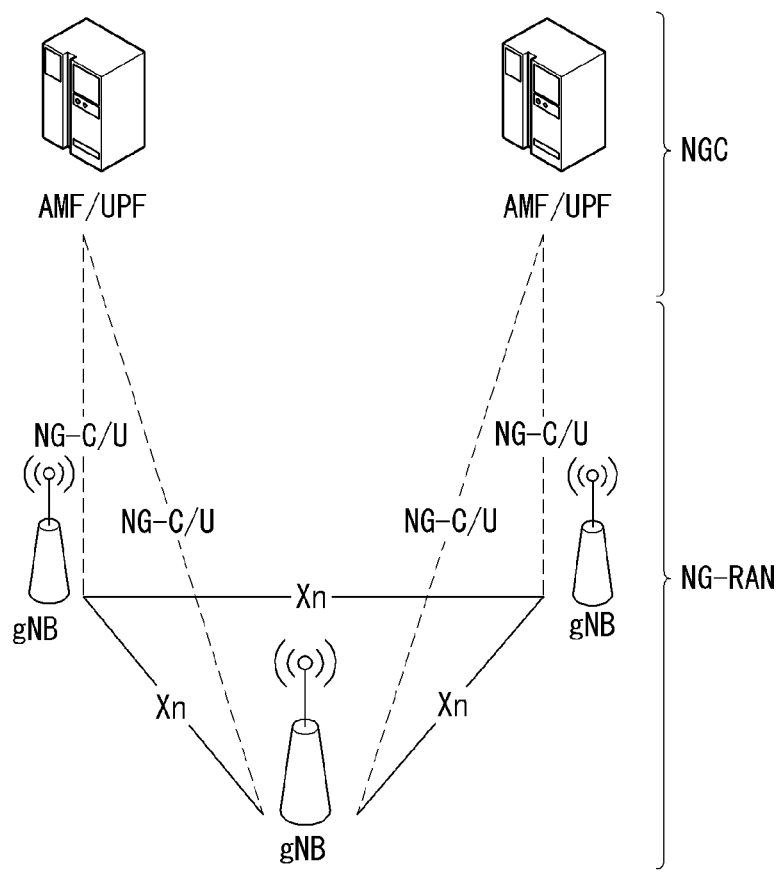
【FIG. 5】
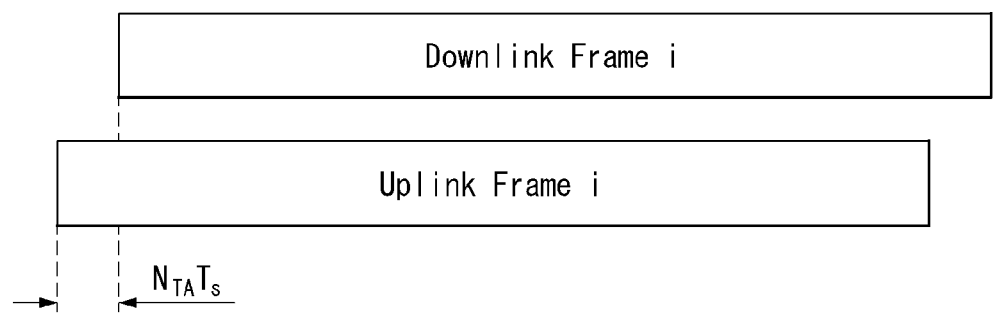

[ FIG. 6 ]
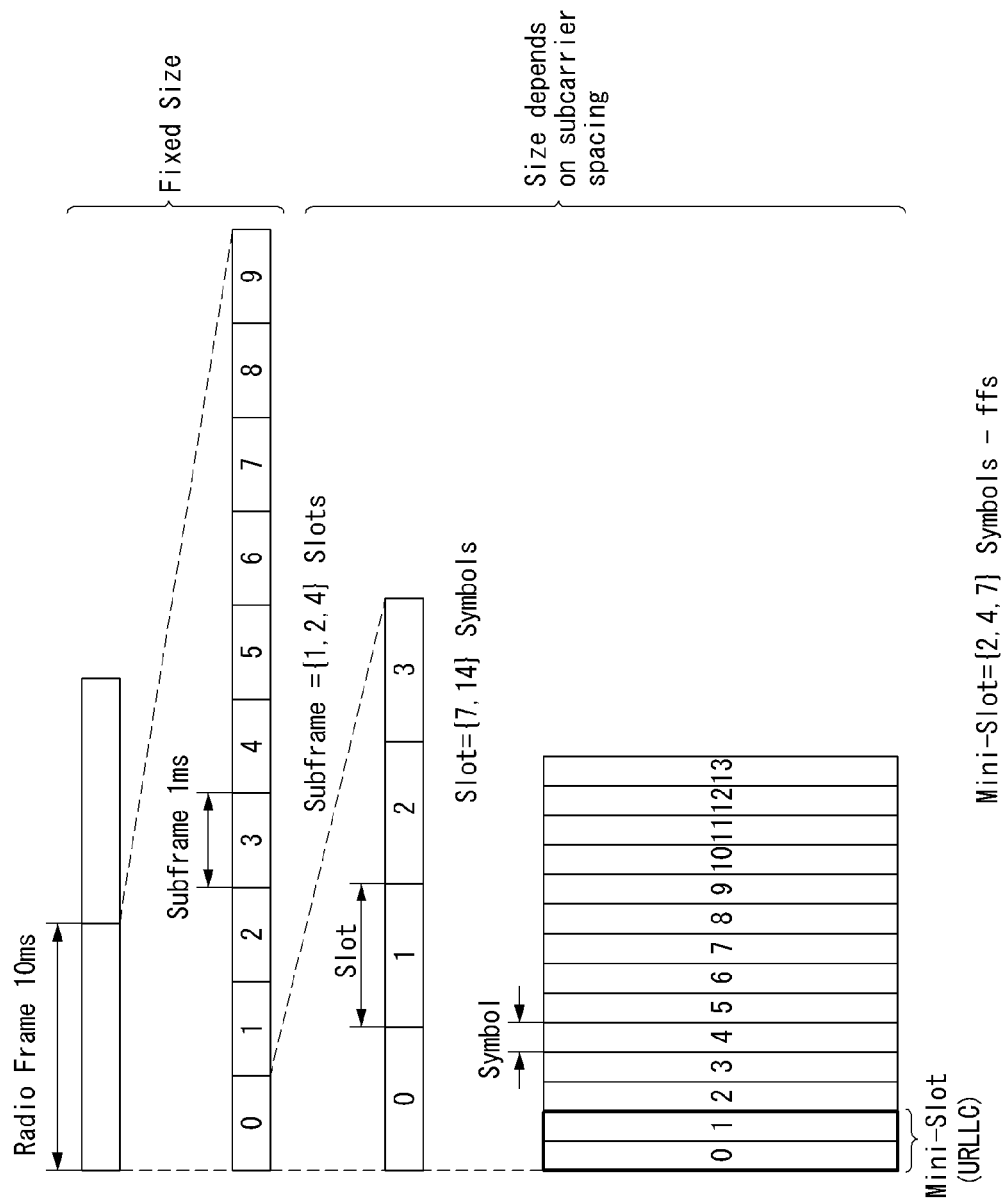

[FIG. 7]
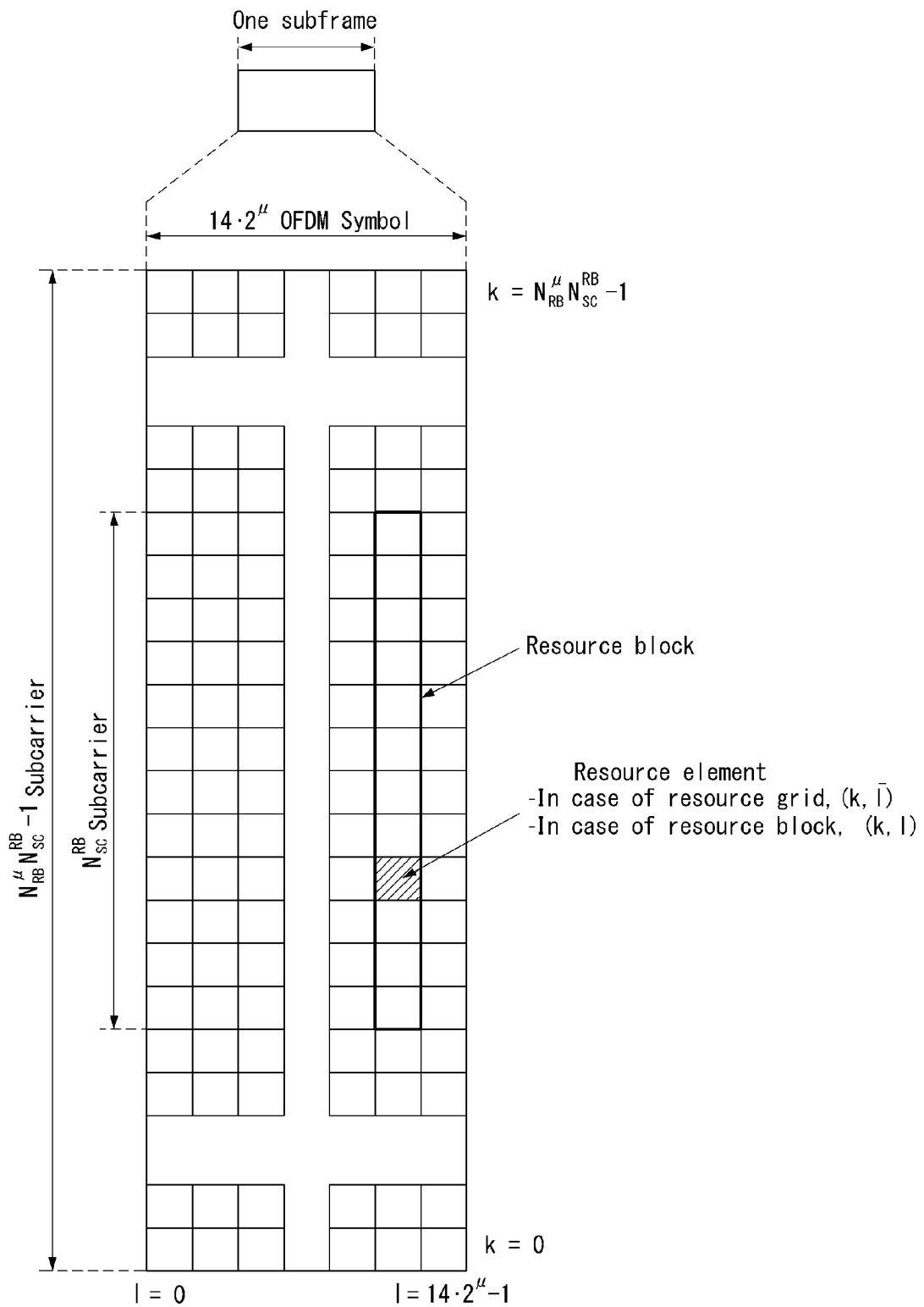

[FIG. 8]
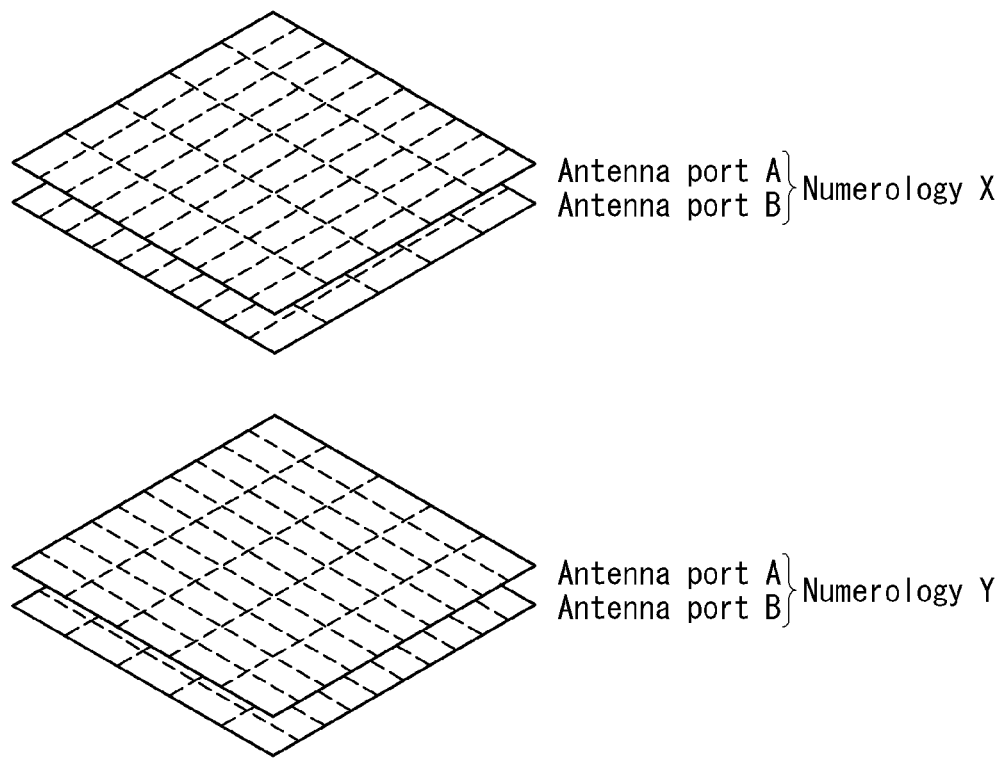

[FIG. 9]
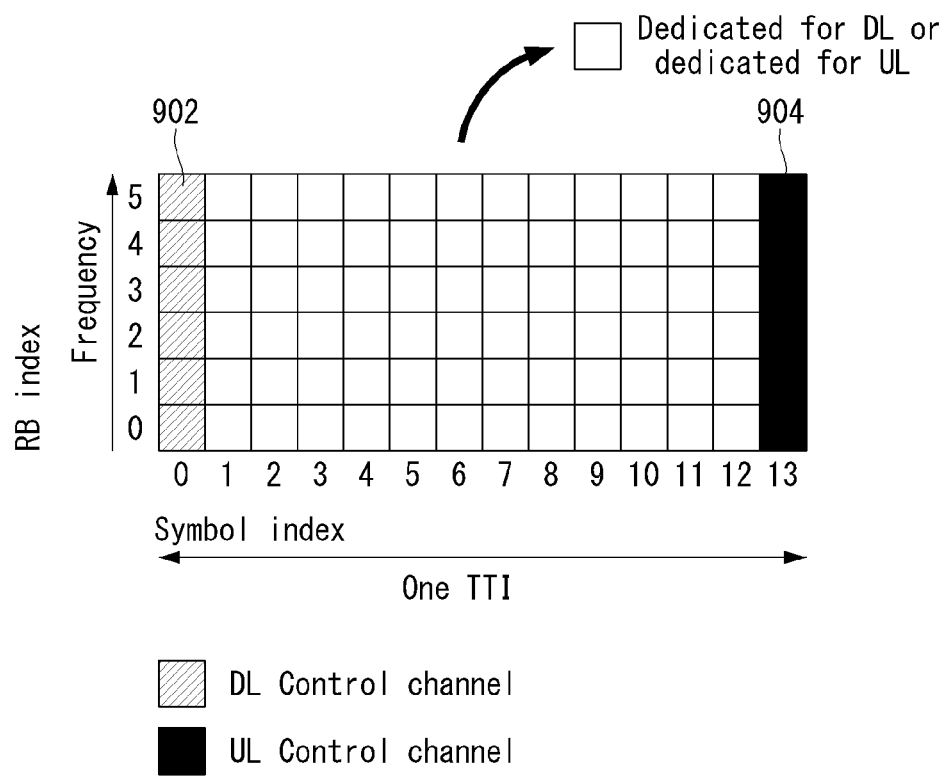

[FIG. 10]
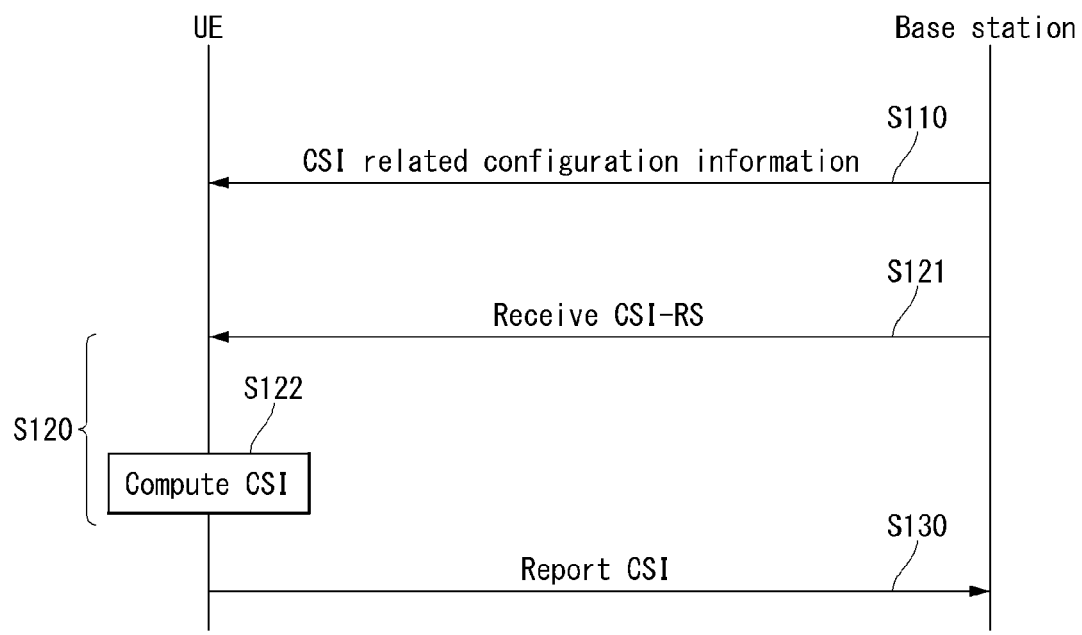

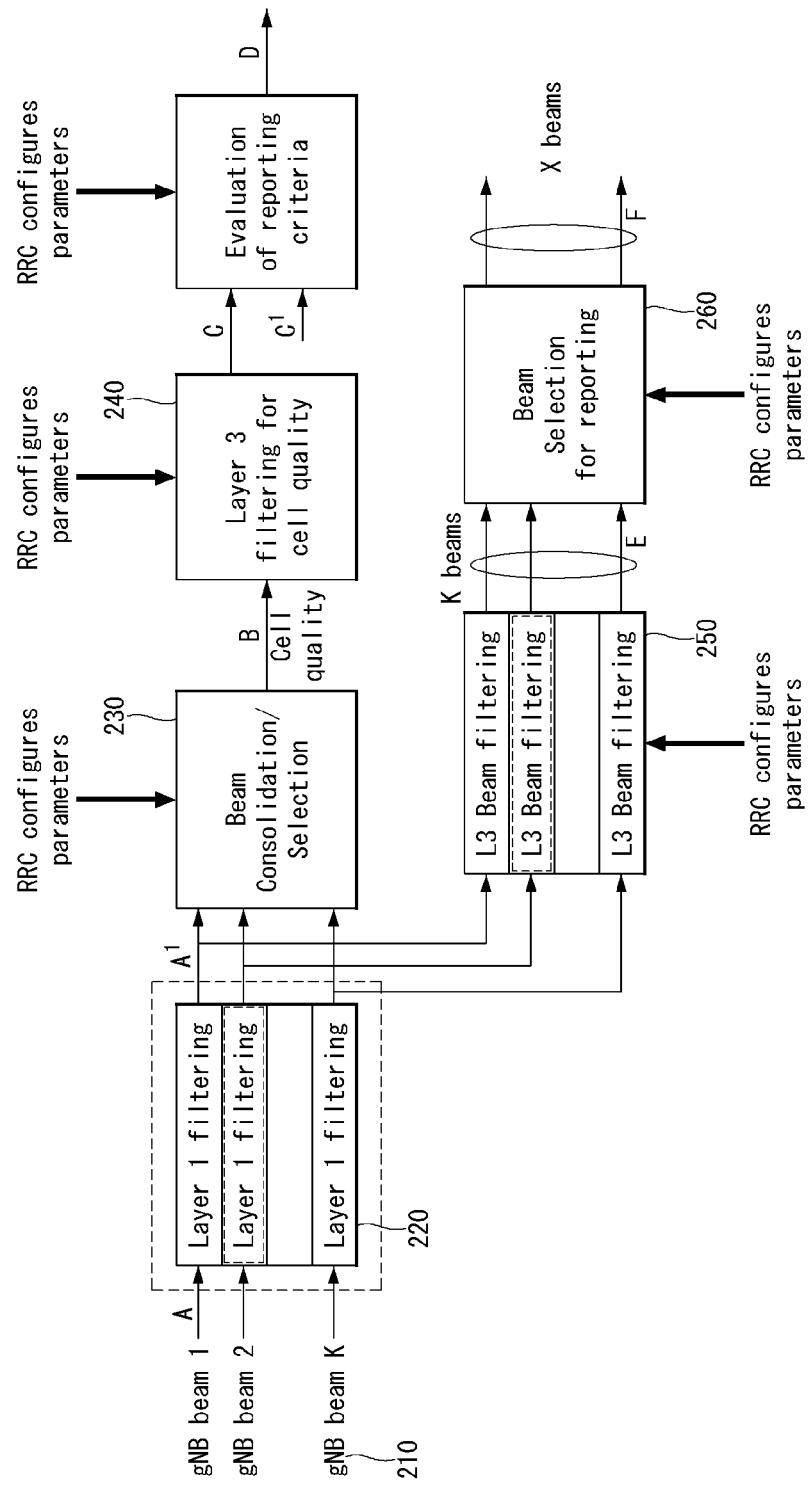
[ FIG. 11 ]

【FIG. 12】
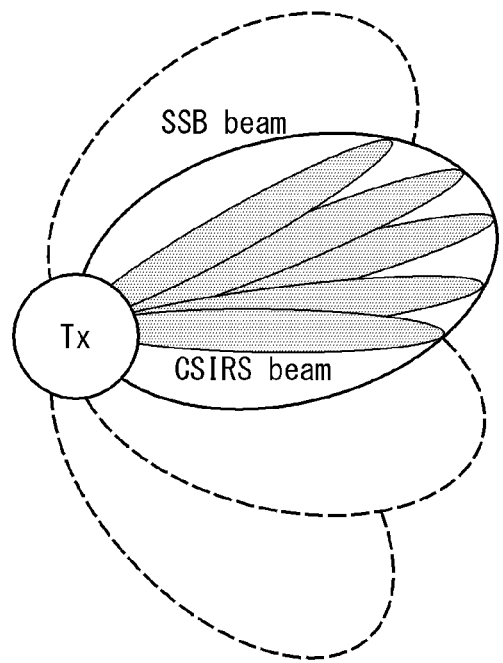
【FIG. 13】
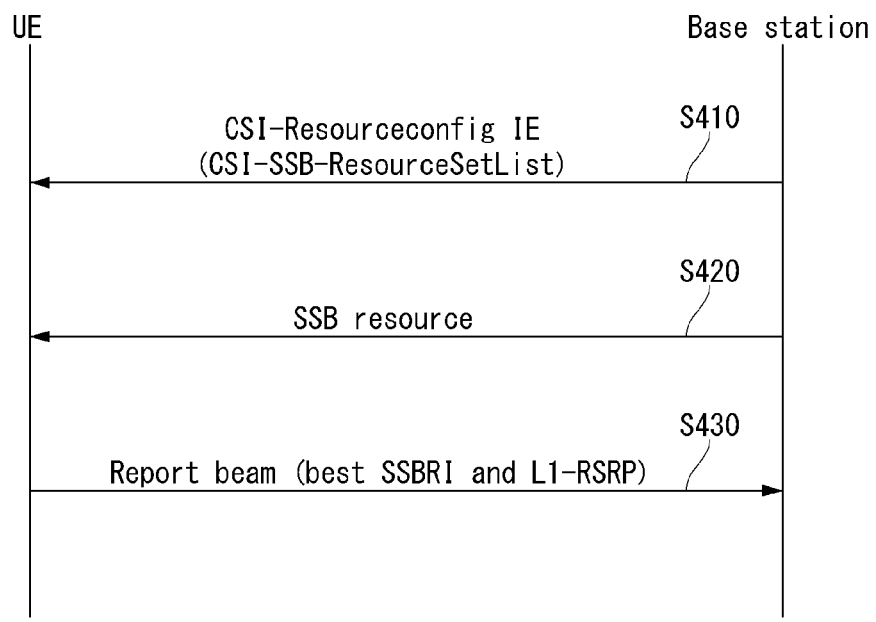

[FIG. 14]
(a)
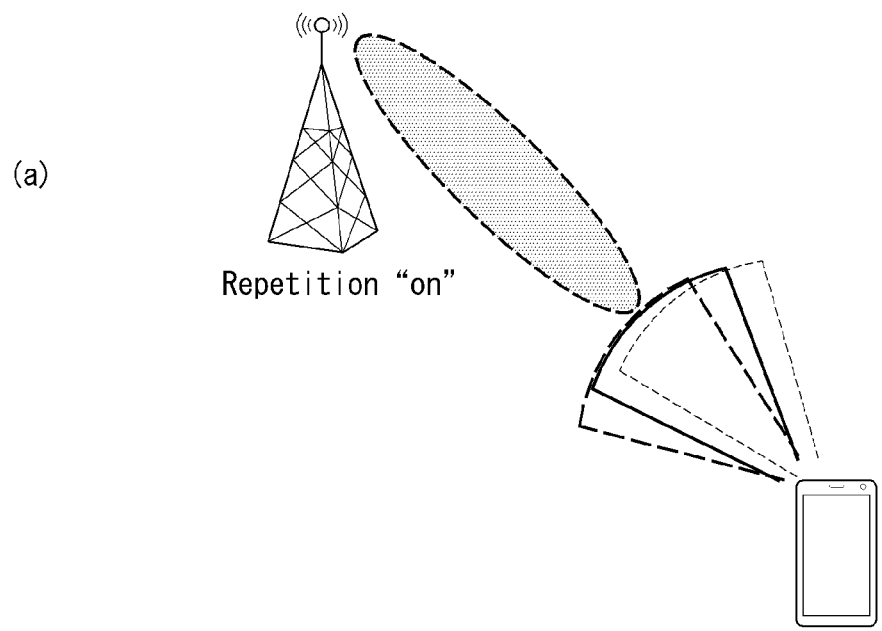
Repetition "on"
(b)
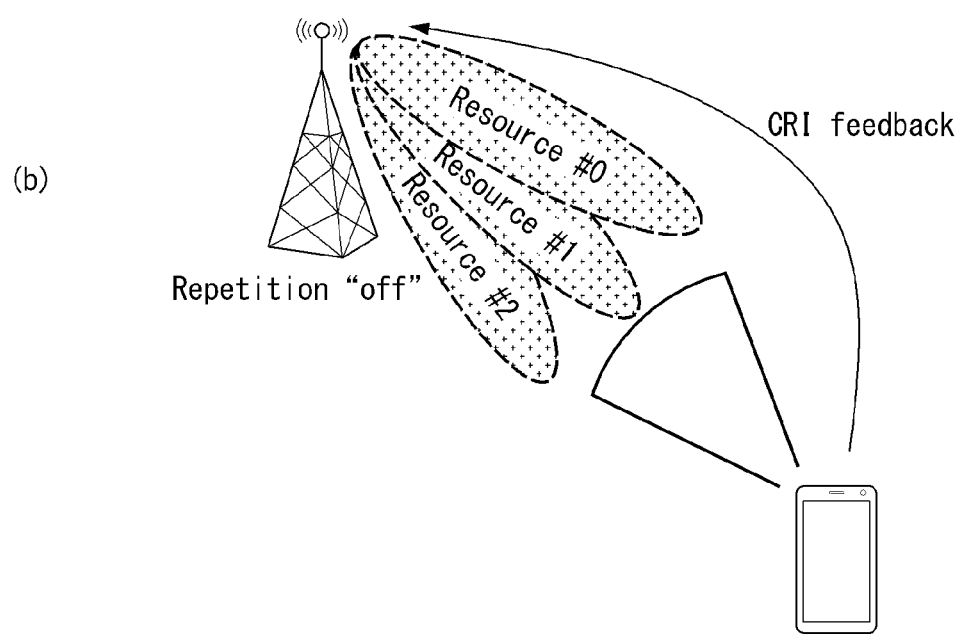
Repetition "off"

[FIG. 15]
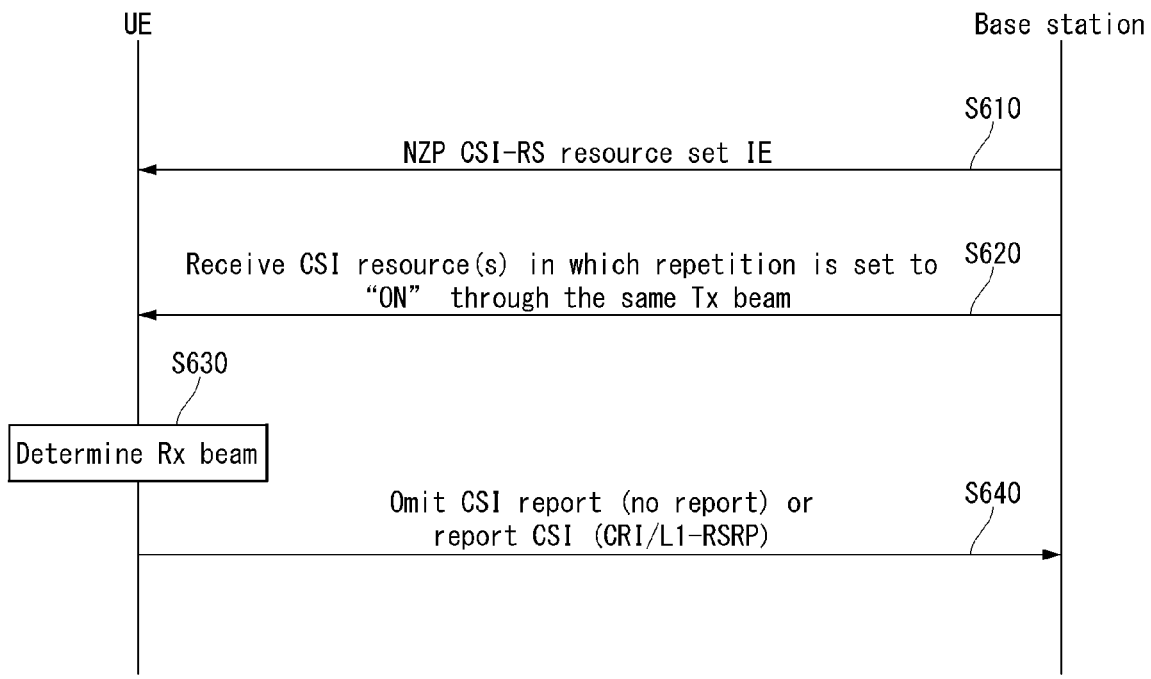
[FIG. 16]
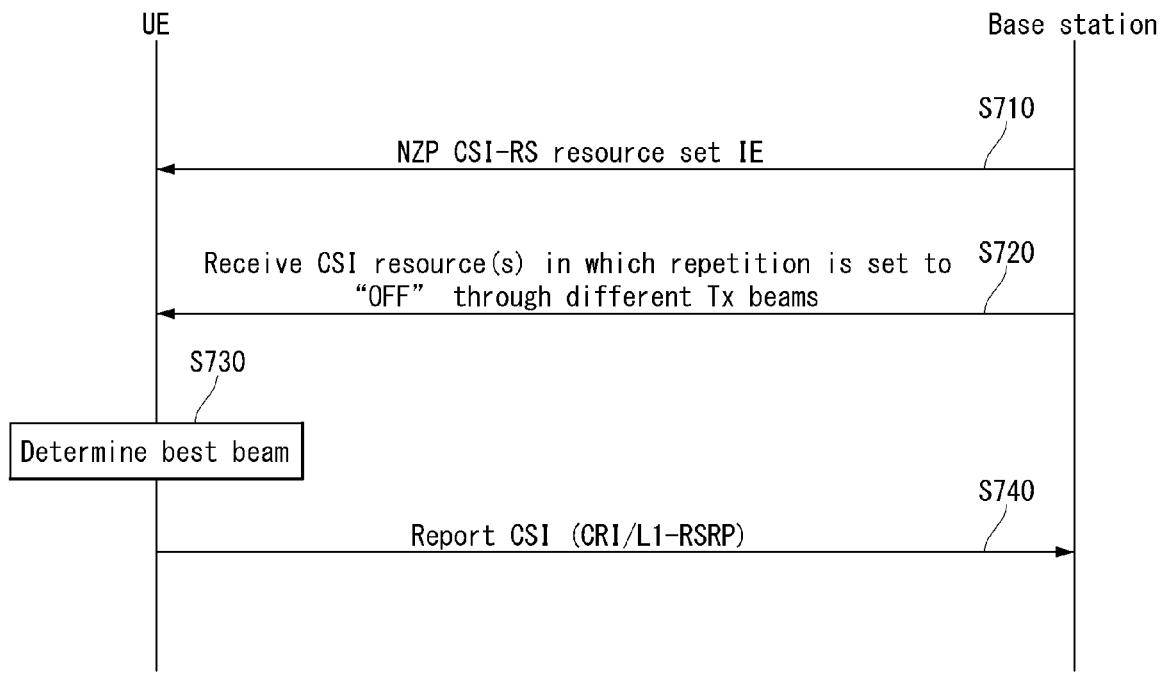

[FIG. 17]
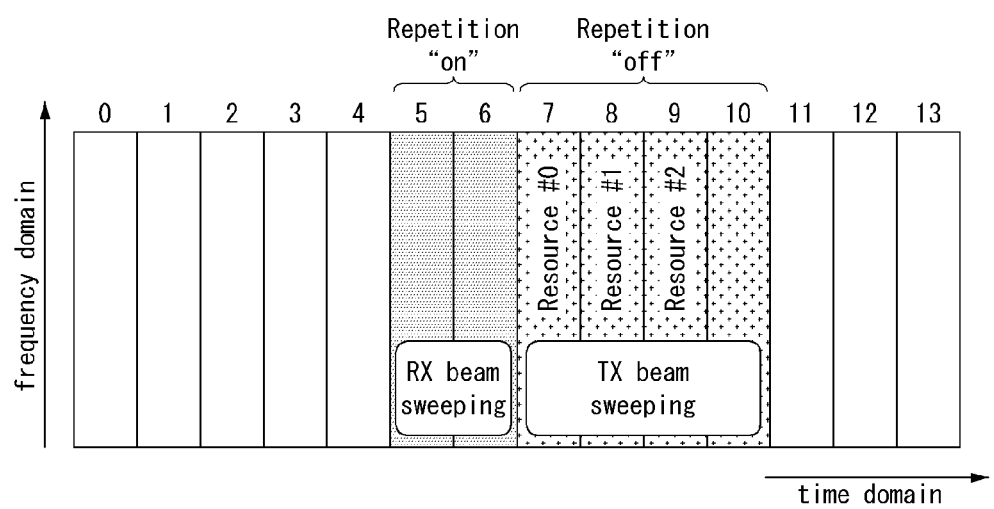

[FIG. 18]
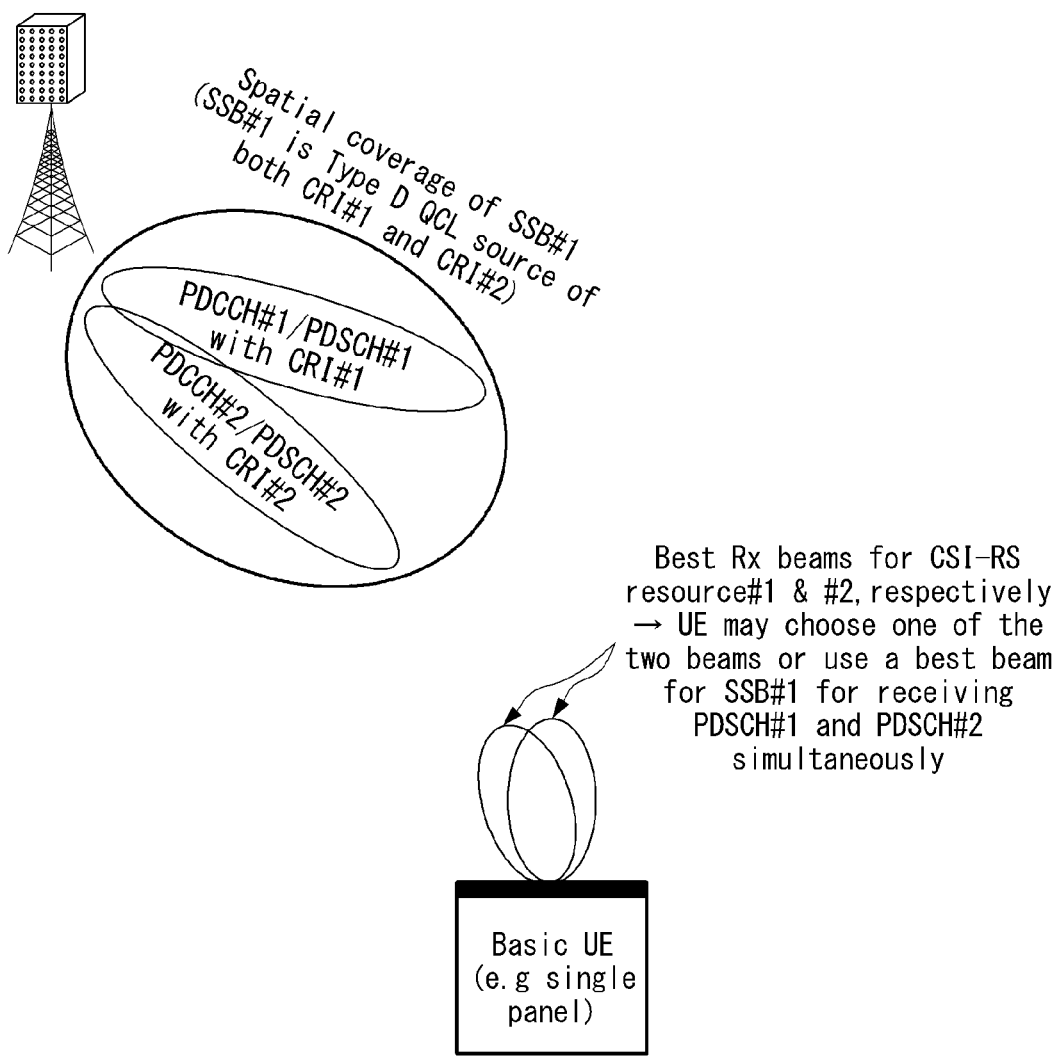

[FIG. 19]
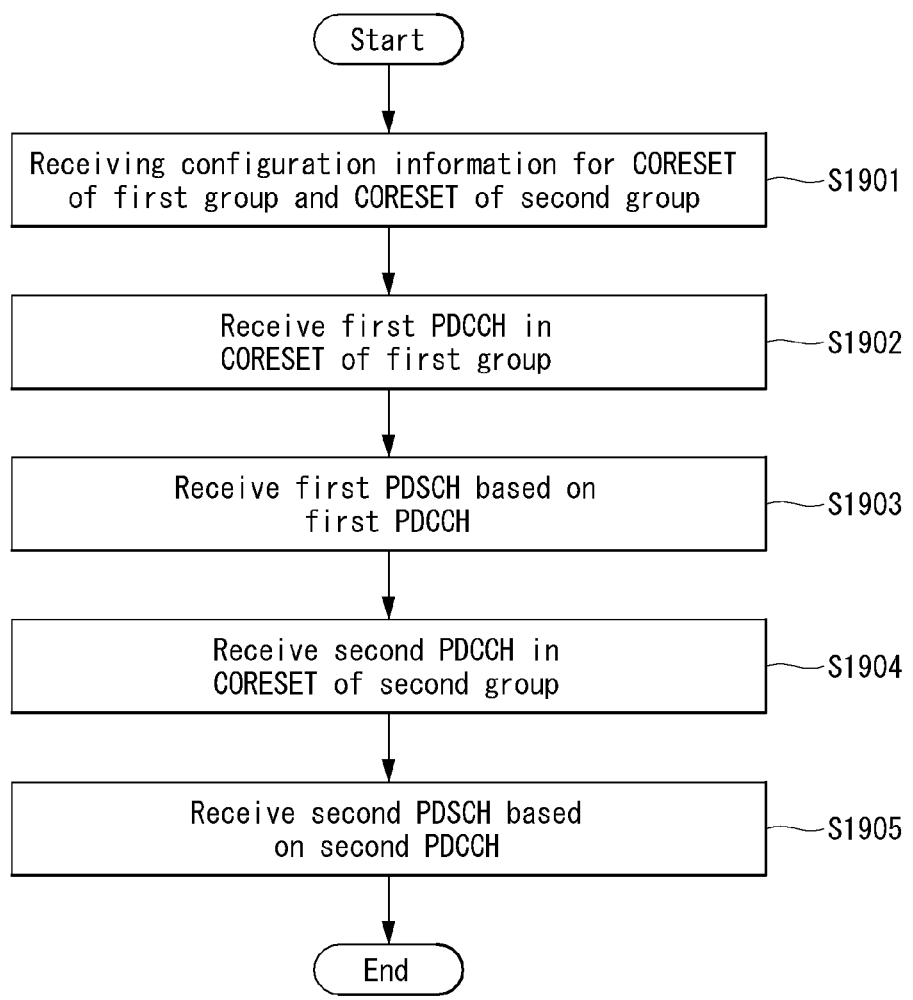

[FIG. 20]
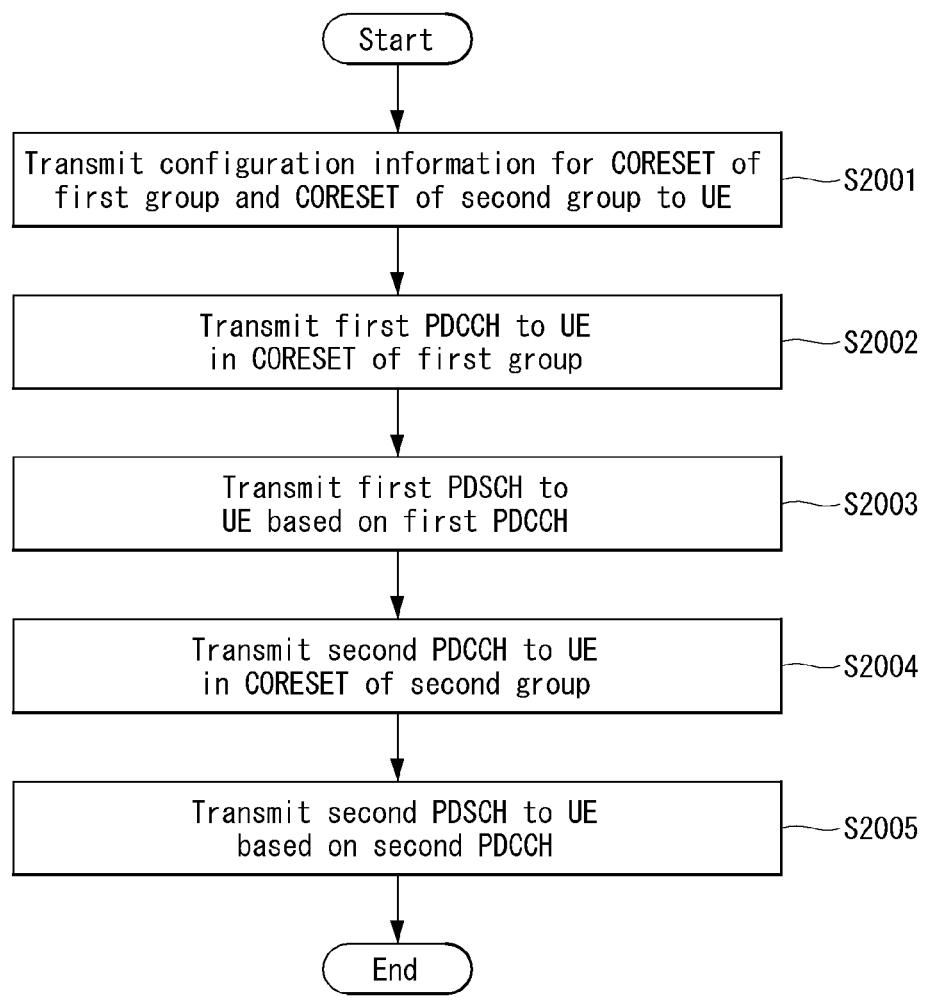

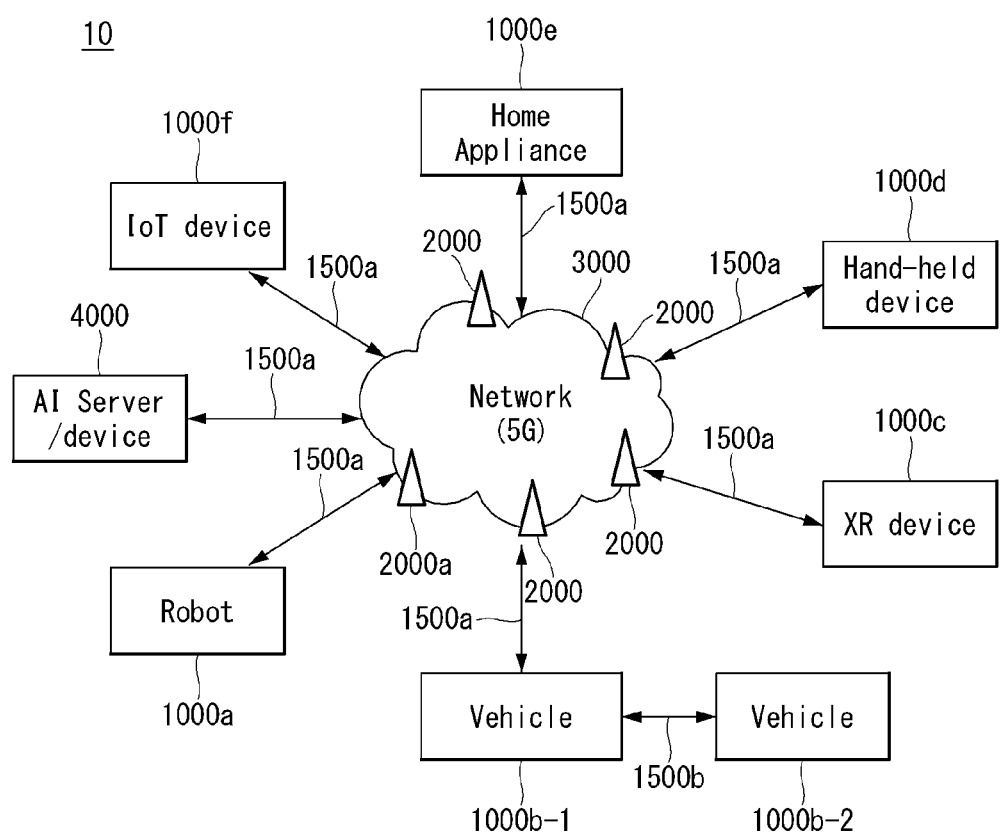
[FIG. 21]

[FIG. 22]
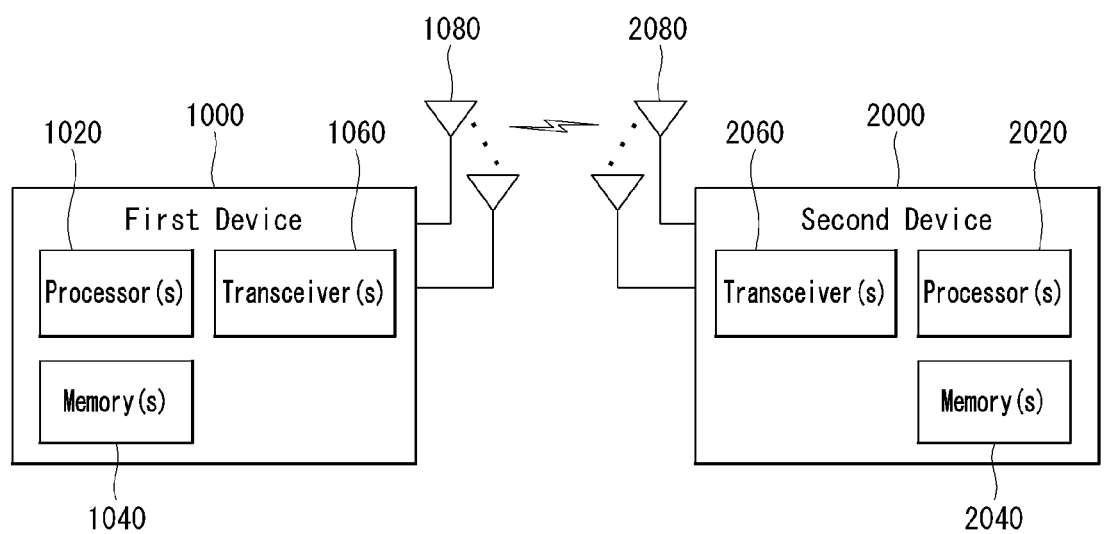

[FIG. 23]
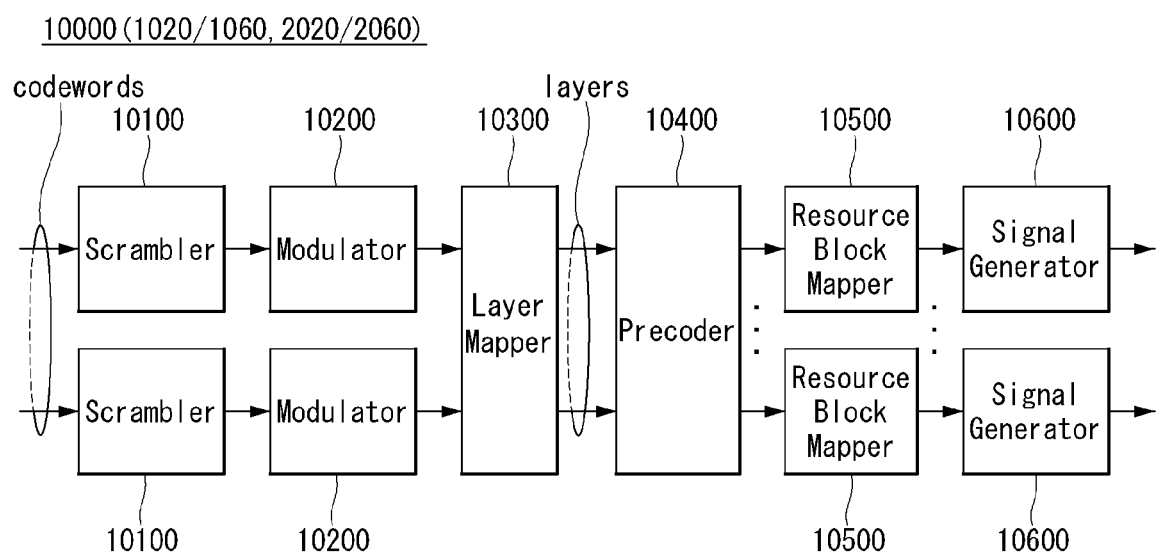

[FIG. 24]
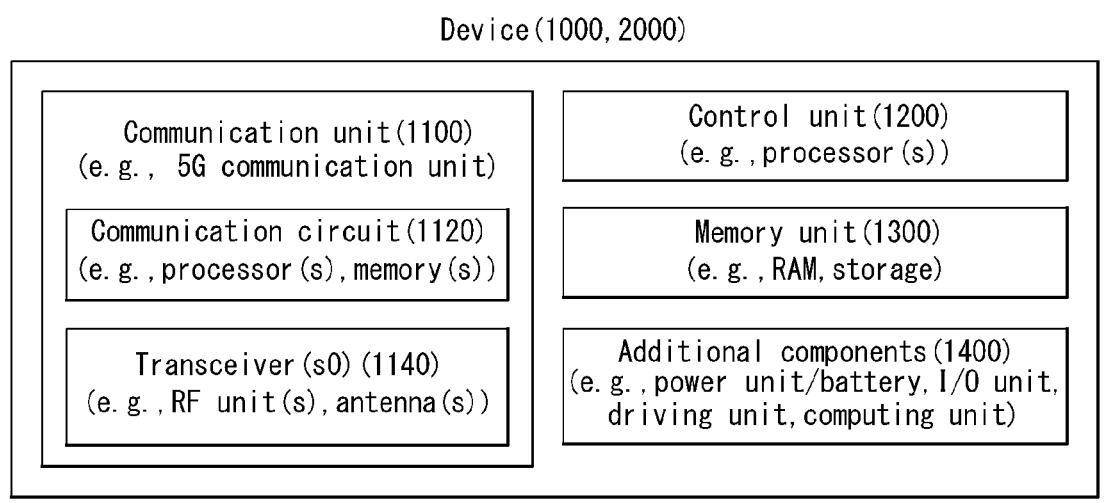

[FIG. 25]
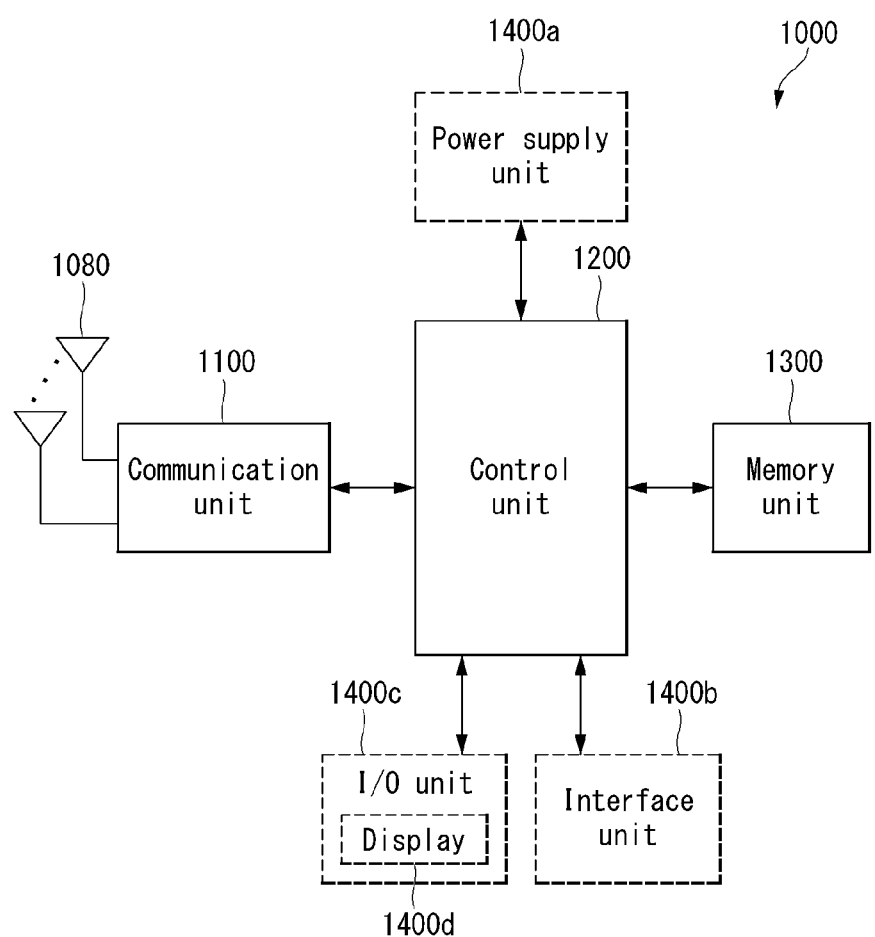

METHOD FOR TRANSMITTING/RECEIVING PHYSICAL DOWNLINK SHARED CHANNEL IN WIRELESS COMMUNICATION SYSTEM, AND DEVICE THEREFOR

CROSS-REFERENCE TO RELATED APPLICATIONS

This application is the National Stage filing under 35 U.S.C. § 371 of International Application No. PCT/KR2020/010963, filed on Aug. 18, 2020, which claims the benefit of U.S. Provisional Application No. 62/887,612, filed on Aug. 15, 2019, the contents of which are all hereby incorporated by reference herein in their entirety.

TECHNICAL FIELD

The present disclosure relates to a wireless communication system, and specifically, to a method for transmitting/receiving a physical downlink shared channel (PDSCH) and a device supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

An object of the present disclosure to provide a method of using a default control resource set (CORESET) for at least one of a plurality of CORESET groups.

Another object of the present disclosure is to provide a method of reporting information on a CORESET group using a default CORESET to a base station.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

The present disclosure proposes a method of receiving a physical downlink shared channel (PDSCH) in a wireless communication system. The method performed by a UE includes receiving configuration information for a control resource set (CORESET) of a first group and a CORESET of a second group, receiving a first physical downlink control channel (PDCCH) in the CORESET of the first group, receiving a first PDSCH based on the first PDCCH, receiving a second PDCCH in the CORESET of the second group, and receiving a second PDSCH based on the second PDCCH, wherein at least one of the first PDSCH and/or the second PDSCH may be received using a default CORESET based on being scheduled within a scheduling offset.

In the above method of the present disclosure, at least one of the first PDSCH and/or the second PDSCH may be received using a spatial QCL reference signal of the default CORESET.

Further, in the above method of the present disclosure, information related to a spatial QCL reference signal of a scheduled PDSCH may be included in a scheduling PDCCH, and information related to the spatial QCL reference signal of at least one of the first PDSCH and/or the second PDSCH may be ignored.

Further, in the above method of the present disclosure, the first PDSCH may be received in a resource scheduled by the first PDCCH, and the second PDSCH may be received in a resource scheduled by the second PDCCH.

Further, in the above method of the present disclosure, the first PDCCH may be received using a spatial QCL reference signal of the CORESET of the first group, and the second PDCCH may be received using a spatial QCL reference signal of the CORESET of the second group.

Further, the above method of the present disclosure may further include reporting information for a group using the default CORESET between the first group and the second group to the base station.

Further, in the above method of the present disclosure, the first PDCCH and the first PDSCH may be received from a different transmission and reception point (TRP), panel, beam, or spatial QCL reference signal from that for the second PDCCH and the second PDSCH.

Further, in the above method of the present disclosure, the UE simultaneously may support a plurality of beams or spatial QCL reference signals.

In addition, a UE receiving a physical downlink shared channel (PDSCH) in a wireless communication system according to the present disclosure includes one or more transceivers, one or more processors operatively coupled to the one or more transceivers, and one or more memories operatively coupled to the one or more processors and storing instructions for performing operations, wherein the operations include receiving configuration information for a control resource set (CORESET) of a first group and a CORESET of a second group, receiving a first physical downlink control channel (PDCCH) in the CORESET of the first group, receiving a first PDSCH based on the first PDCCH, receiving a second PDCCH in the CORESET of the second group, and receiving a second PDSCH based on the second PDCCH, wherein at least one of the first PDSCH and/or the second PDSCH may be received using a default CORESET based on being scheduled within a scheduling offset.

Further, in the above UE of the present disclosure, at least one of the first PDSCH and/or the second PDSCH may be received using a spatial QCL reference signal of the default CORESET.

Further, in the above UE of the present disclosure, information related to a spatial QCL reference signal of a scheduled PDSCH may be included in a scheduling PDCCH, and information related to the spatial QCL reference signal of at least one of the first PDSCH and/or the second PDSCH may be ignored.

Further, in the above UE of the present disclosure, the first PDSCH may be received in a resource scheduled by the first PDCCH, and the second PDSCH may be received in a resource scheduled by the second PDCCH.

Further, in the above UE of the present disclosure, the first PDCCH may be received using a spatial QCL reference signal of the CORESET of the first group, and the second PDCCH may be received using a spatial QCL reference signal of the CORESET of the second group.

Further, in the above UE of the present disclosure, the operations may further include reporting information for a group using the default CORESET between the first group and the second group to the base station.

Further, in the above UE of the present disclosure, the first PDCCH and the first PDSCH may be received from a different transmission and reception point (TRP), panel, beam, or spatial QCL reference signal from that for the second PDCCH and the second PDSCH.

Further, in the above UE of the present disclosure, the UE may simultaneously support a plurality of beams or spatial QCL reference signals.

In addition, the present disclosure proposes a method of transmitting a physical downlink shared channel (PDSCH) in a wireless communication system. The method performed by a base station includes transmitting configuration information for a control resource set (CORESET) of a first group and a CORESET of a second group to a UE, transmitting a first physical downlink control channel (PDCCH) to the UE in the CORESET of the first group, transmitting a first PDSCH to the UE based on the first PDCCH, transmitting a second PDCCH to the UE in the CORESET of the second group, and transmitting the second PDSCH to the UE based on the second PDCCH, wherein at least one of the first PDSCH and/or the second PDSCH may be transmitted using a default CORESET based on being scheduled within a scheduling offset.

In addition, a base station transmitting a physical downlink shared channel (PDSCH) in a wireless communication system according to the present disclosure includes one or more transceivers, one or more processors operatively coupled to the one or more transceivers, and one or more memories operatively coupled to the one or more processors and storing instructions for performing operations, wherein the operations include transmitting configuration information for a control resource set (CORESET) of a first group and a CORESET of a second group to a UE, transmitting a first physical downlink control channel (PDCCH) to the UE in the CORESET of the first group, transmitting a first PDSCH to the UE based on the first PDCCH, transmitting a second PDCCH to the UE in the CORESET of the second group, and transmitting the second PDSCH to the UE based on the second PDCCH, wherein at least one of the first PDSCH and/or the second PDSCH may be transmitted using a default CORESET based on being scheduled within a scheduling offset.

In addition, in a device including one or more memories and one or more processor operatively connected to the one or more memories according to the present invention, wherein the one or more processors are configured to cause the device to receive configuration information for a control resource set (CORESET) of a first group and a CORESET of a second group, to receive a first physical downlink control channel (PDCCH) in the CORESET of the first group, to receive a first PDSCH based on the first PDCCH, to receive a second PDCCH in the CORESET of the second group, and to receive a second PDSCH based on the second PDCCH, wherein at least one of the first PDSCH and/or the second PDSCH may be received using a default CORESET based on being scheduled within a scheduling offset.

In a non-transitory computer-readable medium (CRM) storing one or more instructions according to the present disclosure, the one or more instructions executable by one or more processors cause a UE to receive configuration information for a control resource set (CORESET) of a first group and a CORESET of a second group, to receive a first physical downlink control channel (PDCCH) in the CORESET of the first group, to receive a first PDSCH based on the first PDCCH, to receive a second PDCCH in the CORESET of the second group, and to receive a second PDSCH based on the second PDCCH, wherein at least one of the first PDSCH and/or the second PDSCH may be received using a default CORESET based on being scheduled within a scheduling offset.

Advantageous Effects

According to the present disclosure, it is possible to reduce power consumption that may occur at the time of simultaneously tracking multiple beams by using a default control resource set (CORESET) for at least one of a plurality of CORESET groups.

In addition, according to the present disclosure, it is possible to realize a low-latency and high-reliability wireless communication system in an environment simultaneously supporting multiple beams.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram showing an AI device to which the method proposed in the present disclosure is applicable.

FIG. 2 is a diagram showing the AI server to which the method proposed in the present disclosure is applicable.

FIG. 3 is a diagram showing an AI system 1 to which the method proposed in the present disclosure is applicable.

FIG. 4 shows an example of an overall system structure of NR to which the method proposed in the present disclosure is applicable.

FIG. 5 shows a relationship between an uplink frame and a downlink frame in a wireless communication system to which the method proposed in the present disclosure is applicable.

FIG. 6 illustrates an example of a frame structure in an NR system.

FIG. 7 illustrates an example of a resource grid supported in a wireless communication system to which a method described in the present disclosure is applicable.

FIG. 8 illustrates examples of a resource grid per antenna port and numerology to which a method described in the present disclosure is applicable.

FIG. 9 illustrates an example of a self-contained structure to which a method described in the present disclosure is applicable.

FIG. 10 is a flowchart showing an example of a CSI-related procedure.

FIG. 11 is a conceptual diagram showing an example of a beam-related measurement model.

FIG. 12 is a diagram showing an example of Tx beams related to a DL BM procedure.

FIG. 13 is a flow chart showing an example of a DL BM procedure using an SSB.

FIG. 14 illustrates an example of a DL BM procedure using a CSI-RS.

FIG. 15 is a flow chart showing an example of a received beam determination process of a UE.

FIG. 16 is a flow chart showing an example of a method of determining, by a base station, a transmission beam.

FIG. 17 illustrates an example of resource allocation in time and frequency domains related to the operation of FIG. 14.

FIG. 18 illustrates an embodiment in which ILJT is applied to a basic UE.

FIG. 19 is a flow chart showing an operation method of a UE described in the present disclosure.

FIG. 20 is a flow chart showing an operation method of a base station described in the present disclosure.

FIG. 21 illustrates a communication system 10 applied to the present disclosure.

FIG. 22 illustrates a wireless device applicable to the present disclosure.

FIG. 23 illustrates a signal processing circuit for a transmission signal.

FIG. 24 illustrates another example of a wireless device applied to the present disclosure.

FIG. 25 illustrates a portable device applied to the present disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the following, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Embodiments of the present disclosure may be supported by standard documents disclosed in at least one of IEEE 802, 3GPP, and 3GPP2 which are the wireless access systems. That is, steps or parts in the embodiments of the present disclosure which are not described to clearly show the technical spirit of the present disclosure may be supported by the standard documents. Further, all terms described in this document may be described by the standard document.

3GPP LTE/LTE-A/New RAT (NR) is primarily described for clear description, but technical features of the present disclosure are not limited thereto.

Hereinafter, examples of 5G use scenarios to which a method described in the present disclosure is applicable are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described in detail below.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

Automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an AI device 100 to which a method described in the present disclosure is applicable.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 is a diagram showing the AI server 200 to which a method described in the present disclosure is applicable.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 is a diagram showing an AI system 1 to which a method described in the present disclosure is applicable.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information for a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously run along a given flow without control of a user or that autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through a LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

As smartphones and Internet of Things (IoT) terminals are rapidly spread, the amount of information exchanged through a communication network is increasing. As a result, next-generation wireless access technologies can provide faster service to more users than traditional communication systems (or traditional radio access technologies) (e.g., enhanced mobile broadband communication) Needs to be considered.

To this end, the design of a communication system that considers Machine Type Communication (MTC), which provides services by connecting a number of devices and objects, is being discussed. It is also being discussed as a multiuser of communication systems (e.g., Ultra-Reliable and Low Latency Communication, URLLC) that take into account the reliability and/or latency-sensitive services (service) and/or a user equipment.

Hereinafter, in the present disclosure, for convenience of description, the next generation radio access technology is referred to as NR (New RAT), and the radio communication system to which the NR is applied is referred to as an NR system.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 4 illustrates an example of an overall structure of an NR system to which a method described in the present disclosure is applicable.

Referring to FIG. 4, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 1

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 2.

TABLE 2

| μ | $\Delta f = 2^\mu \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=N(\Delta f_{max} N_f/1000) \cdot T_s=1$ ms. In this case, there may be a set of UL frames and a set of DL frames.

FIG. 5 illustrates the relation between an uplink frame and a downlink frame in a wireless communication system to which a method described in the present disclosure is applicable.

As illustrated in FIG. 5, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

FIG. 6 illustrates an example of a frame structure in an NR system. FIG. 6 is merely for convenience of explanation and does not limit the scope of the disclosure.

In Table 3, in the case of μ=2, i.e., as an example in which a subcarrier spacing (SCS) is 60 kHz, one subframe (or frame) may include four slots with reference to Table 4, and one subframe={1, 2, 4} slots shown in FIG. 6, for example, the number of slot(s) that may be included in one subframe may be defined as in Table 4.

Further, a mini-slot may consist of 2, 4, or 7 symbols, or may consist of more symbols or less symbols.

In relation to physical resources in the NR system, an antenna port, a resource grid, a resource element, a resource block, a carrier part, etc. may be considered.

Hereinafter, the above physical resources that can be considered in the NR system are described in more detail.

First, in relation to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 7 illustrates an example of a resource grid supported in a wireless communication system to which a method described in the present disclosure is applicable.

Referring to FIG. 7, a resource grid consists of $N_{RB}^\mu N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$.

$N_{RB}^{max, \mu}$ denotes a maximum transmission bandwidth and may change not only between numerologies but also between uplink and downlink.

In this case, as illustrated in FIG. 8, one resource grid may be configured per numerology μ and antenna port p.

FIG. 8 illustrates examples of a resource grid per antenna port and numerology to which a method described in the present disclosure is applicable.

Each element of the resource grid for the numerology μ and the antenna port p is called a resource element and is uniquely identified by an index pair (k,l̄), where k=0, . . . , $N_{RB}^{\mu}N_{sc}^{RB}-1$ is an index on a frequency domain, and l̄=0, . . . , $2^{\mu}N_{symb}^{(\mu)}-1$ refers to a location of a symbol in a subframe. The index pair (k, l̄) is used to refer to a resource element in a slot, where l=0, . . . , $N_{smbr}^{\mu}-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

In this case, k may be defined relative to the point A so that k=0 corresponds to a subcarrier centered around the point A. Physical resource blocks are defined within a bandwidth part (BWP) and are numbered from 0 to $N_{BWPi}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

In this case, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

FIG. 9 illustrates an example of a self-contained structure to which a method described in the present disclosure is applicable. FIG. 9 is merely for convenience of explanation and does not limit the scope of the disclosure.

Referring to FIG. 9, as in legacy LTE, it is assumed that one transmission unit (e.g., slot, subframe) consists of 14 orthogonal frequency division multiplexing (OFDM) symbols.

In FIG. 9, a region 902 means a downlink control region, and a region 904 means an uplink control region. Further, regions (i.e., regions without separate indication) other than the region 902 and the region 904 may be used for transmission of downlink data or uplink data.

That is, uplink control information and downlink control information may be transmitted in one self-contained slot. On the other hand, in the case of data, uplink data or downlink data is transmitted in one self-contained slot.

When the structure illustrated in FIG. 9 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 9, a base station (e.g., eNodeB, eNB, gNB) and/or a user equipment (UE) (e.g., terminal) require a time gap for a process for converting a transmission mode into a reception mode or a process for converting a reception mode into a transmission mode. In relation to the time gap, if uplink transmission is performed after downlink transmission in the self-contained slot, some OFDM symbol(s) may be configured as a guard period (GP).

Channel State Information (CSI) Related Procedure

In the NR (New Radio) system, a channel state information-reference signal (CSI-RS) is used for time/frequency tracking, CSI computation, layer 1 (L1)-reference signal received power (RSRP) computation, and mobility.

"A and/or B" used the present disclosure may be interpreted as having the same meaning as "including at least one of A or B".

CSI computation is related to CSI acquisition, and L1-RSRP computation is related to beam management (BM).

Channel state information (CSI) collectively refers to information that can indicate the quality of a radio channel (or link) formed between a terminal and an antenna port.

The operation of a terminal with respect to a CSI-related procedure.

FIG. 10 is a flowchart showing an example of a CSI-related procedure.

In order to perform one of the purposes of the CSI-RS as described above, a terminal (e.g., user equipment (UE)) receives configuration information related to CSI from a base station (e.g., general Node B (gNB)) through radio resource control (RRC) signaling (S110).

The CSI-related configuration information may include at least one of information related to CSI-IM (interference management) resources, information related to CSI measurement configuration, information related to CSI resource configuration, information related to CSI-RS resources, and information related to CSI report configuration.

The information related to CSI-IM resources may include CSI-IM resource information, CSI-IM resource set information, and the like.

The CSI-IM resource set is identified by a CSI-IM resource set identifier (ID), and one resource set includes at least one CSI-IM resource.

Each CSI-IM resource is identified by a CSI-IM resource ID.

The information related to CSI resource configuration defines a group including at least one of a non-zero power (NZP) CSI-RS resource set, a CSI-IM resource set, and a CSI-SSB resource set.

That is, the information related to CSI resource configuration includes a CSI-RS resource set list, and the CSI-RS resource set list may include at least one of a NZP CSI-RS resource set list, a CSI-IM resource set list and a CSI-SSB resource set.

The information related to CSI resource configuration may be represented as a CSI-ResourceConfig IE.

The CSI-RS resource set is identified by a CSI-RS resource set ID, and one resource set includes at least one CSI-RS resource.

Each CSI-RS resource is identified by a CSI-RS resource ID.

As shown in Table 5, parameters (e.g., a BM-related "repetition" parameter and a tracking-related "trs-Info" parameter) indicating the purpose of CSI-RS may be set for each NZP CSI-RS resource set.

Table 5 shows an example of the NZP CSI-RS resource set IE.

TABLE 5

```
-- ASN1START
-- TAG-NZP-CSI-RS-RESOURCESET-START
NZP-CSI-RS-ResourceSet ::=          SEQUENCE {
    nzp-CSI-ResourceSetId              NZP-CSI-RS-ResourceSetId,
    nzp-CSI-RS-Resources               SEQUENCE (SIZE (1..maxNrofNZP-CSI-RS-
ResourcesPerSet)) OF NZP-CSI-RS-ResourceId,
    repetition                         ENUMERATED { on, off }
    aperiodicTriggeringOffset             INTEGER (0..4)
    trs-Info                           ENUMERATED {true}
    ...
}
-- TAG-NZP-CSI-RS-RESOURCESET-STOP
-- ASN1STOP
```

In Table 5, the repetition parameter is a parameter indicating whether the same beam is repeatedly transmitted and indicates whether repetition is "ON" or "OFF" for each NZP CSI-RS resource set. A transmission beam (Tx beam) used in the present disclosure may be interpreted as the same meaning as a spatial domain transmission filter, and a reception beam (Rx beam) may be interpreted as the same meaning as a spatial domain reception filter.

For example, if the repetition parameter of Table 5 is set to "OFF", a UE does not assumes that the NZP CSI-RS resource(s) in a resource set are transmitted through the same Nrofports as the same DL spatial domain transmission filter in all symbols.

In addition, a repetition parameter corresponding to a higher layer parameter corresponds to "CS-RS-ResourceRep" of the L1 parameter.

The information related to CS reporting configuration includes a report configuration type (reportConfigType) parameter indicating a time domain behavior and a report quantity (reportQuantity) parameter indicating a CSI related quantity for reporting.

The time domain behavior may be periodic, aperiodic or semi-persistent.

In addition, the information related to CSI report configuration may be represented as a CS-ReportConfig IE, and Table 6 below shows an example of the CSI-ReportConfig E.

TABLE 6

```
-- ASN1START
-- TAG-CSI-RESOURCECONFIG-START
CSI-ReportConfig ::=                SEQUENCE {
    reportConfigId                     CSI-ReportConfigId,
    carrier                            ServCellIndex             OPTIONAL, --
Need S
    resourcesForChannelMeasurement     CSI-ResourceConfigId,
    csi-IM-ResourcesForInterference    CSI-ResourceConfigId      OPTIONAL, --
```

TABLE 6-continued

```
Need R
    nzp-CSI-RS-ResourcesForInterference      CSI-ResourceConfigId              OPTIONAL, --
Need R
    reportConfigType                         CHOICE {
        periodic                                 SEQUENCE {
            reportSlotConfig                         CSI-ReportPeriodicityAndOffset,
            pucch-CSI-ResourceList                   SEQUENCE (SIZE (1..maxNrofBWPs))
OF PUCCH-CSI-Resource
        },
        semiPersistentOnPUCCH                    SEQUENCE {
            reportSlotConfig                         CSI-ReportPeriodicityAndOffset,
            pucch-CSI-ResourceList                   SEQUENCE (SIZE (1..maxNrofBWPs))
OF PUCCH-CSI-Resource
        },
        semiPersistentOnPUSCH                    SEQUENCE {
            reportSlotConfig                         ENUMERATED {s15, s110, s120, s140,
s180, s1160, s1320},
            reportSlotOffsetList                     SEQUENCE (SIZE (1.. maxNrofUL-
Allocations)) OF INTEGER(0..32),
            p0alpha                                  P0-PUSCH-AlphaSetId
        },
        aperiodic                                SEQUENCE {
            reportSlotOffsetList                     SEQUENCE (SIZE (1..maxNrofUL-
Allocations)) OF INTEGER(0..32)
        }
    },
    reportQuantity                           CHOICE {
        none                                     NULL,
        cri-RI-PMI-CQI                           NULL,
        cri-RI-i1                                NULL,
        cri-RI-i1-CQI                            SEQUENCE {
            pdsch-BundleSizeForCSI                   ENUMERATED {n2, n4}
OPTIONAL
        },
        cri-RI-CQI                               NULL,
        cri-RSRP                                 NULL,
        ssb-Index-RSRP                           NULL,
        cri-RI-LI-PMI-CQI                        NULL
    },
```

Then, a UE measures CSI on based on the configuration information related to the CSI (S120). The CSI measurement may include (1) a CSI-RS reception process of the UE (S121) and (2) a process of computing CSI through the received CSI-RS (S122).

A sequence for the CSI-RS is generated by Equation 3 below, and an initialization value of a pseudo-random sequence C(i) is defined by Equation 4.

$$r(m) = \frac{1}{\sqrt{2}}(1 - 2 \cdot c(2m)) + j\frac{1}{\sqrt{2}}(1 - 2 \cdot c(2m + 1))$$ [Equation 3]

$$c_{init} = (2^{10}(N_{symb}^{slot}n_{s,f}^{\mu} + l + 1)(2n_{ID} + 1) + n_{ID})mod2^{31}$$ [Equation 4]

In Equations 3 and 4, $n_{s,f}^{\mu}$ represents a slot number in a radio frame, and a pseudo-random sequence generator is initialized to Cint at the beginning of each OFDM symbol having $n_{s,f}^{\mu}$.

In addition, 1 is an OFDM symbol number in a slot, and $n_{ID}$ is the same as higher-layer parameter scramblingID.

As for the CSI-RS, resource element (RE) mapping of a CSI-RS resource in the time and frequency domains is set by the higher layer parameter CSI-RS-ResourceMapping.

Table 7 shows an example of the CSI-RS-ResourceMapping IE.

TABLE 7

```
-- ASN1START
-- TAG-CSI-RS-RESOURCEMAPPING-START
CSI-RS-ResourceMapping ::=           SEQUENCE {
    frequencyDomainAllocation            CHOICE {
        row1                                 BIT STRING (SIZE (4)),
        row2                                 BIT STRING (SIZE (12)),
        row4                                 BIT STRING (SIZE (3)),
        other                                BIT STRING (SIZE (6))
    },
    nrofPorts                            ENUMERATED {p1,p2,p4,p8,p12,p16,p24,p32},
    firstOFDMSymbolInTimeDomain          INTEGER (0..13),
    firstOFDMSymbolInTimeDomain2         INTEGER (2..12)
    cdm-Type                             ENUMERATED {noCDM, fd-CDM2, cdm4-FD2-TD2,
cdm8-FD2-TD4},
    density                              CHOICE {
        dot5                                 ENUMERATED {evenPRBs, oddPRBs},
```

TABLE 7-continued

```
    one              NULL,
    three            NULL,
    spare            NULL
  },
  freqBand           CSI-FrequencyOccupation,
  ...
}
```

In Table 7, the density (D) indicates the density of a CSI-RS resource measured in an RE/port/physical resource block (PRB), and nrofPorts indicates the number of antenna ports. Then, the UE reports the measured CSI to a base station (S130).

Here, when the quantity of CSI-ReportConfig of Table 7 is set to "none (or No report)", the UE may omit the report.

However, even when the quantity is set to "none (or No report)", the UE may perform reporting to the base station.

A case where the quantity is set to "none" is a case where an aperiodic TRS is triggered or repetition is set.

Here, the report of the UE may be omitted only when repetition is set to "ON".

To sum up, when repetition is set to "ON" and "OFF", "No report", "SSB resource indicator (SSBRI) and L1-RSRP", "CSI-RS resource indicator (CRI) and L1-RSRP" may be all possible with respect to CSI report.

Alternatively, when repetition is "OFF", CSI report with "SSBRI and L1-RSRP" or "CRI and L1-RSRP" may be transmitted, and when repetition is "ON", "No report", "SSBRI and L1-RSRP" or "CRI and L1-RSRP" may be transmitted.

Beam Management (BM) Procedure

Abeam management (BM) procedure defined in new radio (NR) is described below.

The BM procedure corresponds to layer 1 (L1)/L2 (layer 2) procedures for obtaining and maintaining a set of base station (e.g., gNB or TRP) and/or a terminal (e.g., UE) beams which may be used for downlink (DL) and uplink (UL) transmission/reception, and may include the following procedure and terms.

Beam measurement: an operation of measuring characteristics of a beamforming signal received by a base station or a UE.

Beam determination: an operation of selecting, by a base station or a UE, its own transmission (Tx) beam/reception (Rx) beam.

Beam sweeping: an operation of covering a space region by using a transmission beam and/or a reception beam for a given time interval in a predetermined manner.

Beam report: an operation of reporting, by a UE, information of a beamformed signal based on beam measurement.

FIG. 11 is a conceptual diagram showing an example of a beam-related measurement model.

For beam measurement, an SS block (an SS/PBCH block or an SSB) or channel state information reference signal (CSI-RS) is used on downlink and a sounding reference signal (SRS) is used on uplink.

In RRC_CONNECTED, a UE measures a plurality of beams (or at least one beam) of a cell and may average measurement results (RSRP, RSRQ, SINR, etc.) to derive cell quality.

Accordingly, the UE may be configured to consider a sub-set of detected beam(s).

Filtering related to beam measurement occurs in two different levels (a physical layer for deriving beam quality an RRC level for deriving cell quality in multiple beams).

Cell quality from beam measurement is derived in the same manner for serving cell(s) and a non-serving cell(s).

If the UE is configured to report measurement results with respect to specific beam(s) by a gNB, a measurement report includes measurement results with respect to X best beams. The beam measurement results may be reported with L1-reference signal received power (RSRP).

In FIG. 11, K beams (gNB beam 1, gNB beam 2, . . . , gNB beam k) 210 are configured by a gNB for L3 mobility and correspond to measurement of a synchronization signal (SS) block (SSB) or CSI-RS resources detected by the UE in L1.

In FIG. 11, layer-1 filtering 220 means internal layer-1 filtering of an input measured at a point A.

In addition, in beam consolidation/selection 230, beam specific measurements are integrated (or merged) to derive cell quality.

Layer-3 filtering 240 for cell quality means filtering performed on measurement provided at a point B.

The UE evaluates reporting criteria whenever a new measurement result is reported at least at points C and C1.

D corresponds to measurement report information (message) transmitted through a wireless interface.

L3 beam filtering 250 is performed on measurement (beam specific measurement) provided at a point A1.

In beam selection 260 for beam reporting, X measurement values are selected in measurement provided at a point E.

F represents beam measurement information included in a measurement report (transmitted) through the wireless interface.

In addition, a BM procedure may be divided into (1) a DL BM procedure using a synchronization signal (SS)/physical broadcast channel (PBCH) block or a CSI-RS and (2) a UL BM procedure using a sounding reference signal (SRS).

Further, each BM procedure may include Tx beam sweeping for determining a Tx beam and Rx beam sweeping for determining an Rx beam.

DL BM Procedure

First, the DL BM procedure will be described.

The DL BM procedure may include (1) transmission of beamformed DL reference signals (e.g., CSI-RS or SS block (SSB)) of a base station and (2) beam reporting of a UE.

Here, beam reporting may include preferred DL RS identifier(s) (IDs) and L1-RSRP corresponding thereto.

The DL RS ID may be an SSB resource indicator (SSBRI) or a CSI-RS resource indicator (CRI).

FIG. 12 is a diagram showing an example of Tx beams related to the DL BM procedure.

As shown in FIG. 12, an SSB beam and a CSI-RS beam may be used for beam measurement.

Here, measurement metric is L1-RSRP per resource/block.

An SSB is used for coarse beam measurement, and a CSI-RS may be used for fine beam measurement.

In addition, the SSB can be used for both Tx beam sweeping and Rx beam sweeping.

Rx beam sweeping using the SSB may be performed while a UE changes Rx beams for the same SSBRI across multiple SSB bursts.

Here, one SS burst includes one or more SSBs, and one SS burst set includes one or more SSB bursts.

DL BM Procedure Using SSB

FIG. 13 is a flowchart showing an example of a DL BM procedure using an SSB.

A configuration for a beam report using the SSB is performed during CSI/beam configuration in an RRC connected state (or RRC connected mode).

Like the CSI-ResourceConfig IE of Table 8, a BM configuration using the SSB is not separately defined, and the SSB is set like a CSI-RS resource.

Table 8 shows an example of the CSI-ResourceConfig IE.

TABLE 8

```
-- ASN1START
-- TAG-CSI-RESOURCECONFIG-START
CSI-ResourceConfig ::=                    SEQUENCE {
   csi-ResourceConfigId                   CSI-ResourceConfigId,
   csi-RS-ResourceSetList                 CHOICE {
      nzp-CSI-RS-SSB                      SEQUENCE {
         nzp-CSI-RS-ResourceSetList               SEQUENCE (SIZE (1..maxNrofNZP-CSI-RS-
ResourceSetsPerConfig)) OF NZP-CSI-RS-ResourceSetId OPTIONAL,
         csi-SSB-ResourceSetList                  SEQUENCE (SIZE (1..maxNrofCSI-SSB-
ResourceSetsPerConfig)) OF CSI-SSB-ResourceSetId OPTIONAL
      },
      csi-IM-ResourceSetList                      SEQUENCE (SIZE (1..maxNrofCSI-IM-
ResourceSetsPerConfig)) OF CSI-IM-ResourceSetId
   },
   bwp-Id                                 BWP-Id,
   resourceType                           ENUMERATED { aperiodic, semiPersistent,
periodic },
   ...
}
-- TAG-CSI-RESOURCECONFIGTOADDMOD-STOP
-- ASN1STOP
```

In Table 8, csi-SSB-ResourceSetList parameter represents a list of SSB resources used for beam management and reporting in one resource set. The UE receives a CSI-ResourceConfig IE including a CSI-SSB-ResourceSetList including SSB resources used for BM from the base station (S410).

Here, the SSB resource set may be set to {SSBx1, SSBx2, SSBx3, SSBx4, . . . }.

SSB indices may be defined from 0 to 63.

The UE receives SSB resources from the base station based on the CSI-SSB-ResourceSetList (S420).

When CSI-RS reportConfig related to reporting on SSBRI and L1-RSRP is configured, the UE (beam)-reports the best SSBRI and L1-RSRP corresponding thereto to the base station (S430).

That is, when the reportQuantity of the CSI-RS reportConfig IE is set to "ssb-Index-RSRP", the UE reports the best SSBRI and L1-RSRP corresponding thereto to the base station.

When CSI-RS resources are set in the same OFDM symbol(s) as an SSB (SS/PBCH Block) and "QCL-TypeD" is applicable, the UE may assume that CSI-RS and SSB are quasi-co-located from the viewpoint of "QCL-TypeD".

Here, the QCL TypeD may mean that antenna ports are quasi-co-located in terms of the spatial Rx parameter. When the UE performs reception through a plurality of DL antenna ports in a QCL type D relationship, the same reception beam may be applied.

In addition, the UE does not expect that the CSI-RS will be configured in an RE overlapping the RE of the SSB.

DL BM Procedure Using CSI-RS

When NZP-CSI-RS-ResourceSet in which (higher layer parameter) repetition is set to "ON" is configured for a UE, the UE may assume that at least one CSI-RS resource in the NZP-CSI-RS-ResourceSet is transmitted through a spatial domain transmission filter.

That is, at least one CSI-RS resource in the NZP-CSI-RS-ResourceSet is transmitted through the same Tx beam.

Here, at least one CSI-RS resource in the NZP-CSI-RS-ResourceSet may be transmitted in different OFDM symbols or in different frequency domains (i.e., through FDM).

A case in which the at least one CSI-RS resource is FDM is a case of a multi-panel UE.

Further, when repetition is set to "ON", it is related to the Rx beam sweeping procedure of the UE.

The UE does not expect different periodicities in periodicityAndOffset in all CSI-RS resources in the NZP-CSI-RS-Resourceset.

If the repetition is set to "OFF", the UE does not assume that at least one CSI-RS resource in the NZP-CSI-RS-ResourceSet is transmitted through the same downlink spatial domain transmission filter.

That is, at least one CSI-RS resource in the NZP-CSI-RS-ResourceSet is transmitted through different Tx beams.

When the repetition is set to "OFF", it is related to the Tx beam sweeping procedure of the base station.

The repetition parameter may be set only for CSI-RS resource sets associated with CSI-ReportConfig having a report of L1 RSRP or "No Report (or None)".

If CSI-ReportConfig in which reportQuantity is set to "cri-RSRP" or "none" is configured for the UE, and CSI-ResourceConfig (higher layer parameter resourcesForChannelMeasurement) for channel measurement does not include a higher layer parameter "trs-Info" but includes NZP-CSI-RS-ResourceSet set as a higher layer parameter "repetition" (repetition=ON), the UE may be composed of only ports (1-port or 2-port) having the same number, which have higher layer parameter "nrofPorts" for all CSI-RS resources in the NZP-CSI-RS-ResourceSet.

More specifically, with respect to the purpose of CSI-RS, when the repetition parameter is set in a specific CSI-RS resource set and TRS_info is not set, the CSI-RS is used for beam management.

When the repetition parameter is not set and TRS_info is set, the CSI-RS is used for a tracking reference signal (TRS).

In addition, when the repetition parameter is not set and TRS_info is not set, the CSI-RS is used for CSI acquisition.

FIG. 14 is a diagram showing an example of a DL BM procedure using a CSI-RS.

FIG. 14(a) shows an Rx beam determination (or refinement) procedure of a UE, and FIG. 14(b) shows a Tx beam determination procedure of a base station.

The repetition parameter is set to "ON" in the case of FIG. 14(a), and the repetition parameter is set to "OFF" in the case of FIG. 14(b).

An Rx beam determination process of a UE will be described with reference to FIGS. 14 (a) and 15.

FIG. 15 is a flowchart showing an example of the Rx beam determination process of a UE.

The UE receives an NZP CSI-RS resource set IE including higher layer parameter repetition from a base station through RRC signaling (S610).

Here, the repetition parameter is set to "ON".

The UE repeatedly receives resource(s) in a CSI-RS resource set in which repetition is set to "ON" in different OFDM symbols through the same Tx beam (or DL spatial domain transmission filter) of the base station (S620).

Accordingly, the UE determines an Rx beam thereof (S630).

Here, the UE omits the CSI report or transmits a CSI report including CRI/L1-RSRP to the base station (S640).

In this case, reportQuantity of CSI report config may be set to "No report (or None)" or "CRI+L1-RSRP".

That is, when repetition is set to "ON", the UE may omit CSI report or report ID information (CRI) about a beam pair-related preferred beam and a quality value (L1-RSRP) with respect to the ID information.

A Tx beam determination process of a base station will be described with reference to FIGS. 14(b) and 16.

The UE receives resources in a CSI-RS resource set in which repetition is set to "OFF" through different Tx beams (DL spatial domain transmission filter) of the base station (S720).

The UE selects (or determines) a best beam (S740) and reports the ID and quality-related information (e.g., L1-RSRP) of the selected beam to the base station (S740).

In this case, reportQuantity of CSI report config may be set to "CRI+L1-RSRP".

That is, when the CSI-RS is transmitted for BM, the UE reports CRI and L1-RSRP therefor to the base station.

FIG. 17 is a diagram showing an example of resource allocation in the time and frequency domains related to the operation of FIG. 14.

That is, when repetition "ON" is set in the CSI-RS resource set, a plurality of CSI-RS resources are repeatedly used by applying the same Tx beam. When repetition "OFF" is set in the CSI-RS resource set, different CSI-RS resources may be regarded as being transmitted through different Tx beams.

DL BM-Related Beam Indication

A UE may be RRC-configured with a list of up to M candidate transmission configuration indication (TCI) states for the purpose of at least quasi co-location (QCL) indication, where M may be 64.

Each of the TCI states may be configured as one RS set.

Each ID of a DL RS for at least a spatial QCL purpose (QCL Type D) within the RS set may refer to one of DL RS types, such as an SSB, a P-CSI RS, an SP-CSI RS, and an A-CSI RS.

The initialization/update of an ID of a DL RS(s) within the RS set used for the at least spatial QCL purpose may be performed through at least explicit signaling.

Table 9 illustrates an example of a TCI-State IE.

The TCI-State IE associates one or two DL reference signals (RS) with a corresponding quasi co-location (QCL) type.

TABLE 9

| | |
|---|---|
| -- ASN1START | |
| -- TAG-TCI-STATE-START | |
| TCI-State ::= | SEQUENCE { |
|  tci-StateId | TCI-StateId, |
|  qcl-Type1 | QCL-Info, |
|  qcl-Type2 | QCL-Info |
|  ... | |
| } | |
| QCL-Info ::= | SEQUENCE { |
|  cell | ServCellIndex |
|  bwp-Id | BWP-Id |
|  referenceSignal | CHOICE { |
|   csi-rs | NZP-CSI-RS-ResourceId, |
|   ssb | SSB-Index |
|  }, | |
|  qcl-Type | ENUMERATED {typeA, typeB, typeC, typeD}, |
|  ... | |
| } | |
| -- TAG-TCI-STATE-STOP | |
| -- ASN1STOP | |

FIG. 16 is a flowchart showing an example of a Tx beam determination process of a base station.

A UE receives an NZP CSI-RS resource set IE including higher layer parameter repetition from the base station through RRC signaling (S710).

Here, the repetition parameter is set to "OFF" and is related to the Tx beam sweeping procedure of the base station.

In Table 9, the bwp-Id parameter indicates a DL BWP where an RS is located. The cell parameter indicates a carrier where an RS is located. The reference signal parameter indicates a reference antenna port(s) that becomes the source of a quasi co-location for a corresponding target antenna port(s) or a reference signal including the reference antenna port(s). A target antenna port(s) may be a CSI-RS, a PDCCH DMRS, or a PDSCH DMRS. For example, in order to indicate QCL reference RS information for an NZP CSI-RS, a corresponding TCI state ID may be indicated in NZP CSI-RS resource configuration information. Furthermore, for example, in order to indicate QCL reference information for a PDCCH DMRS antenna port(s), a TCI state ID may be indicated in a CORESET configuration. Furthermore, for example, in order to indicate QCL reference information for a PDSCH DMRS antenna port(s), a TCI state ID may be indicated via DCI.

Quasi-Co Location (QCL)

An antenna port is defined so that a channel on which a symbol on an antenna port is carried is inferred from a channel on which another symbol on the same antenna port is carried. If the properties of a channel on which a symbol on one antenna port is carried can be derived from a channel on which a symbol on another antenna port is carried, the two antenna ports may be said to have a quasi-co-located or quasi co-location (QC/QCL) relation.

In this case, the properties of the channel include one or more of delay spread, Doppler spread, a frequency/Doppler shift, average received power, received timing, and a spatial RX parameter. In this case, the spatial Rx parameter means a spatial (reception) channel property parameter, such as an angle of arrival.

In order to decode a PDSCH according to a detected PDCCH having intended DCI with respect to a corresponding UE and a given serving cell, a UE may be configured with a list of up to M TCI-State configurations within higher layer parameter PDSCH-Config. The M depends on a UE capability.

Each of the TCI-States includes a parameter for configuring a quasi-co-location relation between one or two DL reference signals and the DM-RS port of a PDSCH.

The quasi co-location relation is configured as a higher layer parameter qcl-Type1 for a first DL RS and a higher layer parameter qcl-Type2 (if configured) for a second DL RS.

In the case of the two DL RSs, QCL types are not the same regardless of whether reference is the same DL RS or different DL RSs.

A quasi co-location type corresponding to each DL RS is given by a higher layer parameter qcl-Type of QCL-Info, and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and with a specific SSB from a QCL-Type D viewpoint. A UE configured with such an indication/configuration may receive a corresponding NZP CSI-RS by using Doppler, delay value measured in a QCL-TypeA TRS, and may apply, to the reception of the corresponding NZP CSI-RS, an Rx beam used for the reception of a QCL-TypeD SSB.

The UE receives an activation command used to map up to eight TCI states to the codepoint of a DCI field "Transmission Configuration Indication."

Coordinated multi-point (CoMP) transmission was introduced in the LTE system and partially introduced in NR Rel-15. CoMP includes various transmission methods such as a method of transmitting the same signal or information from a plurality of transmission and reception points (TRPs) (same layer joint transmission), a method of performing transmission by a specific TRP at a specific moment in consideration of radio channel quality and traffic load conditions while a plurality of TRPs share information to be transmitted to UEs (point selection), and/or a method of transmitting different signals or information by a plurality of TRPs according to spatial dimension multiplexing (SDM) through different spatial layers (independent layer joint transmission).

As a typical point selection method, there is a dynamic point selection (DPS) method in which TRPs participating in transmission can be changed at the moment of transmitting a physical downlink shared channel (PDSCH), and a term defined to indicate which TRP has transmitted a PDSCH is quasi-co-location (QCL). QCL is indicated and/or set by a base station to a UE and represents whether the UE can assume that different antenna ports are identical in terms of a specific channel property (e.g., Doppler shift, Doppler spread, average delay, delay spread and/or sptial RX parameter). When a physical downlink shared channel (PDSCH) is transmitted by TRP #1, it indicates that a specific reference signal (RS) (e.g., CSI-RS resource #1) and corresponding PDSCH demodulation reference signal (DMRS) antenna ports are quasi-co-located. When the PDSCH is transmitted by TRP #2, it indicates that a specific RS (e.g., CSI-RS resource #2) and corresponding PDSCH DMRS antenna ports are quasi-co-located.

To indicates instantaneous QCL information through downlink control information (DCI), a PDSCH quasi-colocation information (PQI) field has been defined in LTE, and a transmission configuration information (TCI) field has been defined in NR.

The QCL indication and/or setting method defined in the standard can be generally used for not only cooperative transmission between a plurality of TRPs but also cooperative transmission between a plurality of panels (antenna groups) of the same TRP, cooperative transmission between a plurality of beams of the same TRP, and the like. This is because, even if transmission is performed by the same TRP, signals transmitted through the panels and/or beams may be subjected to different Doppler and delay characteristics and/or reception beams (spatial Rx parameter) if the transmission panels or the beams are different.

In next-generation wireless communication systems, standardization of a method of transmitting a plurality of TRPs, panels, and/or beams transmit different layer groups to a UE, that is, independent layer joint transmission (ILJT) or non-coherent joint transmission (NCJT), is under discussion.

The above description (3GPP system, frame structure, NR system, etc.) can be applied in combination with methods proposed in the present disclosure, which will be described later, or supplemented to clarify the technical characteristics of the methods proposed in the present disclosure.

In the present disclosure, '/' means 'and', 'or', or 'and/or' depending on the context.

There are two major approaches in applying ILJT (or NCJT). One is a method in which a plurality of TRPs, panels, and/or beams each transmit a physical downlink control channel (PDCCH) to cooperatively transmit data to a UE (multi-PDCCH based approach), and the other is a method in which only one TRP, panel, and/or beam transmits a PDCCH, and a plurality of TRPs, panels, and/or beams participate in physical downlink shared channel (PDSCH) transmission to cooperatively transmit data (single PDCCH based approach).

In the present disclosure, when ILJT is performed by applying the multi-PDCCH based approach, in particular, when (analog) beamforming is applied to a base station and/or a UE (in a high frequency band), methods for efficiently performing multi-PDCCH based ILJT are proposed.

It may be assumed that a UE applies (analog) beamforming to downlink reception. In other words, it can be said that the UE receives a downlink signal using a specific beam among a plurality of candidate beams. RS information (i.e., QCL source for Type D, or spatial QCL information) that is quasi-co-located in terms of the above-described spatial Rx parameter can help the UE determine a PDSCH reception beam. If a plurality of PDSCH layer groups are transmitted to the UE and the respective PDSCH layer groups are transmitted from different TRPs, panels, and/or beams, an optimal UE Rx beam and/or panel for receiving each PDSCH layer group may be different. There is a problem that such an operation may be an operation that is impossible to implement for a specific UE.

In addition, since NR supports a method of dynamically indicating a (spatial) QCL source of a PDSCH through DCI of a PDCCH (by setting tci-PresentInDCI=ON) and a method of following a spatial Rx parameter of the PDCCH that schedules the PDSCH as it is (by setting tci-PresentInDCI=OFF), it is necessary to define an ILJT operation according to each mode.

Further, after DCI decoding, it takes time for a UE to change beams according to the spatial Rx parameter information of the PDSCH indicated by the DCI (this threshold is called a Threshold-Sched-Offset value). Accordingly, a method of scheduling the PDSCH at a time earlier than the corresponding time threshold is also allowed in order to support faster scheduling and to provide more freedom in implementing a base station scheduler in the NR system.

When the PDSCH is allocated at a time earlier than the threshold in this manner, the UE uses a prescribed default (spatial) QCL parameter. In other words, the UE buffers the corresponding slot using the prescribed default (spatial) QCL parameter, and if a time domain location of the indicated PDSCH is earlier than the threshold from the result of decoding DCI, receives the corresponding PDSCH through the buffered signal. Default QCL information to be buffered by the UE is defined as "CORESET associated with a monitored search space and having a lowest CORESET ID in a latest slot in which one or more CORESETs are monitored by the UE in an active BWP of a serving cell" in the current NR standard (hereinafter, referred to as default QCL information in the current NR standard). In other words, the default QCL information is defined as "QCL reference signal RS information for (specific) QCL parameter(s) of CORESET associated with a monitored search space and having a lowest CORESET ID in a latest slot in which one or more CORESETs are monitored by the UE in an active BWP of a serving cell". For example, (default) QCL information may include a QCL source and a QCL type.

Hereinafter, although not strictly correct, a default QCL source defined in Rel-15 is described as "transmission configuration indication (TCI) (state) of the lowest CORESET ID" for convenience.

In the case of multi-PDCCH-based ILJT operation, there is a problem of how to define the default QCL, and the present disclosure proposes various solutions to this problem.

First, it may be assumed that a UE does not receive signals having different Type D QCL sources (e.g., spatial QCL information) at the same time. This is the same assumption as when designing Rel-15 NR. Hereinafter, in the present disclosure, a UE having these characteristics may be represented as "UE having basic UE capability".

In implementation, the corresponding UE may be a UE to which only one Rx beam can be applied at a time (e.g., a UE having a single Rx panel). When it is assumed that the multi-PDCCH based ILJT operation is applied to the corresponding UE, each PDCCH will have a characteristic that it is transmitted and/or received in a non-overlapped symbol set (e.g., through two TDMed CORESETs). In other words, a basic UE does not expect to detect or receive two or more PDCCHs (having different (Type D) QCL sources) in a specific PDCCH symbol.

Depending on UE implementation, there may be a UE capable of simultaneously receiving two or more beams at one time. In other words, the UE may receive signals having different Type D QCL sources at the same time. Hereinafter, in the present disclosure, a UE having such characteristics can be represented as "UE having enhanced UE capability".

In implementation, as an example of a UE having such characteristics, a UE equipped with a plurality of reception panels may be assumed. A UE having enhanced UE capability has a feature that a plurality of PDCCHs having different Type D QCL sources can be transmitted and/or received in the same symbol.

If UE capability is subdivided, UE capability of simultaneous reception of up to N PDCCHs (having different Type D QCL sources) may be defined.

The aforementioned capability (e.g., whether a UE has basic UE capacity or enhanced UE capability) is information reported by a UE to a base station and/or a network (during network/cell connection), the base station can control whether to overlap PDCCHs (having different Type D QCL sources) and/or the number of overlapped PDCCHs (having different Type D QCL sources) for the corresponding UE.

Although there is a constraint that a UE having basic UE capability must receive all PDSCH layers with the same beam, a UE having enhanced UE capability can receive each layer group by applying a different Rx beam thereto and thus ILJT can be relatively freely applied. Therefore, for UEs operating with a plurality of candidate (analog) beams, a method of applying the ILJT operation only to UEs having enhanced UE capability and limiting application of the ILJT operation to UEs having basic UE capability (e.g., a UE having basic UE capability does not assume and/or expect different QCL sources for different layers of the same PDSCH) may be considered.

In other words, in the case of a UE having basic UE capability (e.g., when two default TCIs/QCL assumptions are not supported), a base station may not expect PDCCH related configuration for multi-PDCCH based ILJT (e.g., a plurality of CORESETs configured in the same bandwidth part (BWP) is configured to belong to a plurality of different CORESET groups (i.e., TRPs) from the corresponding UE.

However, if a UE having basic UE capability can make Rx beams coincide for all layer groups, ILJT may be applied.

FIG. 18 shows an embodiment of applying ILJT to a basic UE. It may be assumed that PDCCHs and/or a PDSCHs are transmitted from one TRP by applying different panels and/or beams. In this case, it may be assumed that PDSCH #1 and PDSCH #2 partially or fully overlap at least on the time side and a UE performs ILJT operation in overlapping symbol(s) (e.g., 4 layers are received in overlapping symbols in case of rank-2 transmission per PDSCH). It may be assumed that QCL source RSs transmitted through respective panels and/or beams are a CSI-RS resource (CRI) #1 and a CSI-RS resource (CRI) #2. An optimal Rx beam for receiving CRI #1 and CRI #2 may be different for the UE, but if CRI #1 and CRI #2 are transmitted in similar beam directions, the UE may set an (analog) Rx beam in accordance with one of the two. Even in this case, the performance is not significantly varied. That is, the UE may apply and/or assume one common Type D QCL source for both PDSCHs.

Here, even a basic UE can assume different QCL sources for respective PDSCHs for the Doppler shift, Doppler spread, average delay, and/or delay spread, which are QCL parameters other than a beam (i.e., spatial Rx parameter). That is, the UE receives both PDSCHs by setting one Rx beam through a common type D QCL source assumption, but can receive the same by applying values obtained by measuring delay and/or Doppler parameters in CRI #1 and #2 in PDSCH demodulation.

In other words, when the UE performs PDSCH demodulation in a modem (digital stage) while receiving all layers through the same (RF or analog) beam, the UE may divide layer groups, apply different long term channel parameters to respective layer groups, and perform demodulation. This is because, if signals transmitted from the same TRP are transmitted through different panels, for example, they may have different delay properties due to a line delay difference between panels and may have different measured Doppler characteristics due to different RF properties of the panels.

Hereinafter, the present disclosure proposes a method (hereinafter, proposal 1) for performing ILJT operation based on a plurality of PDCCHs in the case of a UE having basic UE capability, a method (hereinafter, proposal 2) for performing ILJT operation based on a plurality of PDCCHs in the case of a UE having enhanced UE capability, and a method (hereinafter, proposal 3) for improving power consumption by simultaneously tracking a plurality of default beams.

Hereinafter, embodiments described in the present disclosure are divided only for convenience of description, and some methods and/or some configurations of a certain embodiment may be substituted with or combined with methods and/or configurations of other embodiments. For example, a base station may receive a report on whether a UE has basic UE capability or enhanced UE capability from the UE and expect that the UE will operate through any one (e.g., proposal 1-1-3) of proposals 1 and 2 which will be described below according to the capability of the UE.

As another example, in performing ILJT operation based on a plurality of PDCCHs, a UE may report to a base station that the UE has basic UE capability, operate through the method of proposal 1-1-1 if tci-PresentInDCI=ON is set, and operate through the method of proposal 1-1-2 if tci-PresentInDCI=OFF is set.

As another example, when the UE supports only one Rx beam at the same time (when the UE does not support two default TCIs/QCL assumptions), the UE may not expect or assume PDSCH scheduling within a threshold. In other words, at this time, the UE may operate as in proposal 1-1-1 or proposal 1-1-2. In addition, the base station may not schedule PDSCHs within the threshold when receiving, from the UE, information on UE capability supporting only one Rx beam at the same time.

Proposal 1

First, in the case of a UE having basic UE capability, a method for performing ILJT operation based on a plurality of PDCCHs will be described in detail.

Hereinafter, proposal 1 will be described by being divided into a method (proposal 1-1) for a case in which each PDCCH schedules an independent PDSCH and/or time positions of PDSCHs completely or partially overlap and, a method (proposal 1-2) for a case in which one PDSCH is jointly scheduled, for a UE having basic UE capability.

As an example of proposal 1-2, a case in which each PDCCH schedules a specific layer group of a PDSCH may be considered. As another example, two PDCCHs may carry different pieces of information (by being hierarchically designed). In the latter case, a resource allocation (RA) field may be present only in DCI transmitted by one of two PDCCHs.

Hereinafter, for convenience of description, the term "spatially QCL (spatially QCL, sQCL) will be often used, which may have the same meaning as QCL for spatial Rx parameters or QCL for Type D QCL parameters.

Hereinafter, the methods to be described are merely divided for convenience, and the configuration of a certain method may be substituted with or combined with the configuration of another method.

(Proposal 1-1)

First, a method for a case in which each PDCCH schedules an independent PDSCH and/or time positions of PDSCHs completely or partially overlap for a UE having basic UE capability will be described.

In the case of proposal 1-1, the frequency side positions of PDSCHs may fully or partially overlap, or non-overlap.

Hereinafter, proposal 1-1 will be described by being divided into a case (proposal 1-1-1) in which a PDSCH is scheduled after a predetermined time threshold from a PDCCH transmission time in consideration of a time required for DCI decoding, a time required for beam change, and the like, and tci-PresentInDCI=ON is set, a case (proposal 1-1-2) in which a PDSCH is scheduled after the predetermined time threshold from the PDCCH transmission time, and tci-PresentInDCI=OFF is set, and a case (proposal 1-1-3) in which any one of all PDSCHs is scheduled before a predetermined time threshold. For example, the threshold may mean a time required to apply spatial QCL information or a minimum time.

For example, when the UE supports only one Rx beam at the same time (if the UE does not support two default TCIs/QCL assumptions), the UE may not expect or assume PDSCH scheduling within the threshold. In other words, at this time, the UE may operate as in proposal 1-1-1 or proposal 1-1-2. In addition, the base station may not schedule a PDSCH within the threshold when receiving, from the UE, information on UE capability supporting only one Rx beam at the same time.

With respect to the threshold, (1) a Threshold-Sched-Offset value defined and/or set in Rel-15 NR (for non-ILJT use) is commonly applied, (2) a scheduling offset value is additionally set and/or defined to be applied to a multi-PDCCH based ILJT case (e.g., a case in which a plurality of overlapping PDSCHs are scheduled, a case in which a plurality of CORESET groups are configured, or a case in which a plurality of CORESET groups are configured and PDCCHs (corresponding to specific RNTI and/or specific DCI format/type (e.g., DL grant) are received from different CORESET groups (within a certain time or simultaneously), or (3) a value (e.g., 2×Threshold-Shed-Offset) obtained by adding a specific value (set and/or indicated by the base station) to the Threshold-Sched-Offset value defined and/or set in Rel-15 NR (for non-ILJT) or multiplying the Threshold-Sched-Offset value by the specific value may be applied.

The method (2) or (3) is applied because, when the UE performs serial processing, in particular, it may take a longer time to receive a single PDCCH and to complete DCI decoding than a necessary time in order for the UE to receive multiple PDCCHs and then complete DCI decoding. Which one of (1) to (3) will be applied may depend on (reported) capability of the UE, and a value or a parameter set within the same method (e.g., a value added or multiplied in method (3)) may depend on the capability of the UE.
(Proposal 1-1-1)

Proposal 1-1-1 may be applied when all PDSCHs are scheduled after a predetermined time threshold and PDSCH TCI is indicated by DCI (i.e., when tci-PresentInDCI=ON is set).

One piece of Type D QCL source information for a plurality of PDSCHs is transmitted to a UE through one of pieces of DCI transmitted through a plurality of PDCCHs. In this case, QCL source information for QCL parameter(s) other than the spatial Rx parameter for each PDSCH may be included in DCI of a PDCCH carrying scheduling information for each PDSCH and transmitted.

For example, the DCI transmitted in each PDCCH may include a TCI field, and only a QCL source (e.g., Type A QCL source) for QCL parameters other than the spatial Rx parameter can be indicated and/or set in TCI(s) other than one TCI (the UE does not expect that the Type D QCL source will be set and/or indicated in both TCI states).

As another example, the TCI field may be present in the DCI transmitted through each PDCCH, and each TCI may include Type D QCL source information. If two or more (different) pieces of Type D QCL source information are indicated to the UE, the UE may ignore Type D QCL source information indicated by TCI of remaining DCI except for one (specific) piece of DCI.

As another example, a TCI is present in only one (specific) piece of DCI among pieces of DCI transmitted through PDCCHs. That is, the UE does not expect to receive two or more TCIs in a plurality of pieces of DCI scheduling a plurality of overlapping PDSCHs.

As another example, the TCI field may be present in DCI transmitted through each PDCCH, and when the UE receives a plurality of TCIs, TCI information indicated by TCIs of the remaining DCI except for one (specific) piece of DCI is ignored.

In the above, the "specific" DCI may be DCI transmitted through a PDCCH in which the last (or start) symbol position is later (or earlier) or DCI of a PDCCH received in a CORESET having a larger (or smaller) number of CORESET (group) IDs.

And/or, in proposal 1-1-1, (when the QCL source for QCL parameters other than the spatial Rx parameter is different for each PDSCH) Type D QCL source may be restrictively applied only to a specific RS type (e.g., synchronization signal block (SSB)).

For example, when there are (narrow beam) CSI-RS #1 and CSI-RS #2 which have been sQCLed with (wide beam) SSB #1, as shown in FIG. 18, CSI-RS #1 as a Type A QCL source and SSB #1 as a Type D QCL source may be indicated for PDSCH #1 allocated by PDCCH #1, and CSI-RS #2 as a Type A QCL source and SSB #1 as a Type D QCL source may be indicated for PDSCH #2 allocated by PDCCH #2. That is, TCI in DCI1 on PDCCH #1 may be indicated in the form (CRI #1, SSB #1), and TCI in DCI2 on PDCCH #2 may be indicated in the form (CRI #2, SSB #1) (TCI=(CRI #1, SSB #1) in DCI1 on PDCCH #1, TCI=(CRI #2, SSB #1) in DCI2 on PDCCH #2).

In this manner, it may be more efficient to limit Type D QCL sources for a plurality of PDSCHs to the SSB (RS transmitted through a wider beam than CSI-RS).

Accordingly, in the present disclosure, the UE can receive a plurality of PDSCHs transmitted from a plurality of base stations, TRPs, panels, and/or beams based on a plurality of PDCCHs without ambiguity of (single) Rx (analog) beam configuration.
(Proposal 1-1-2)

Proposal 1-1-2 may be applied when all PDSCHs are scheduled after a predetermined time threshold and PDSCH TCI is not indicated by DCI (i.e., when tci-PresentInDCI=OFF is set).

A UE assumes that the a QCL source of each PDSCH is the same as a QCL source of a PDCCH (or the corresponding CORESET) that schedules each PDSCH. If Type D QCL sources of respective PDCCHs are different, (1) the UE selects, assumes and/or applies a Type D QCL source of one (specific) PDCCH (or the corresponding CORESET), or (2) the UE detects the same RS among RSs in sQCL relationship with the Type D QCL sources of the respective PDCCHs (or the corresponding CORESET), and assume and/or apply the RS as a Type D QCL source of the corresponding PDSCHs.

The above proposal is a method for a basic capability UE to make Rx beams coincide when Type D QCL sources indicated by corresponding TCIs are different while maintaining the existing method in which each PDSCH TCI follows the TCI of the PDCCH that schedules the corresponding PDSCH as much as possible.

For example, one "specific" PDCCH in the above description may be a PDCCH in which the last (or start) symbol position is later (or earlier) or a PDCCH received in a CORESET having a larger (or small) of CORESET (group) IDs.

As an example of detecting the same RS among RSs in the sQCL relationship with the Type D QCL sources of respective PDCCH (or the corresponding CORESET) and assume and/or apply the RS as the Type D QCL source of the corresponding PDSCHs, if CORESET1 TCI=(CSI-RS #x, CSI-RS #x) and CORESET2 TCI=(CSI-RS #y, CSI-RS #y), CSI-RS #x and CSI-RS #y are assumed as Type A QCL sources for PDSCH1 and PDSCH2 scheduled by PDCCH1 and PDCCH2 received in each CORESET, and SSB #z is assumed as a common Type D QCL source of both PDSCHs on the assumption that SSB #z spatially QCLed with both CSI-RS #x and CSI-RS #y (by a chain rule) is present for Type D QCL sources.

The chain rule means that a QCL source may be searched for according to a multi-level QCL relationship such as RS A==>RS B==>RS C(==>meaning the relationship between a QCL source and a target).

Accordingly, in the present disclosure, the UE can receive a plurality of PDSCHs transmitted from a plurality of base stations, TRPs, panels, and/or beams based on a plurality of PDCCHs without ambiguity of (single) Rx (analog) beam configuration.
(Proposal 1-1-3)

Proposal 1-1-3 may be applied when any one of all PDSCHs is scheduled before a predetermined time reference.

If a specific PDSCH is allocated within a predetermined time threshold, a UE assumes (Type D) QCL sources (or spatial QCL information) of (resource overlapping) other PDSCH(s) as well as the corresponding PDSCH as a default (Type D) QCL source (like the (Type D) QCL source of the specific PDSCH) (even if the corresponding PDSCH is allocated after the predetermined time).

The default QCL source (or default spatial QCL information) may be the same as TCI (the above-mentioned default QCL information in the current NR standard) corresponding to the lowest CORESET identifier (ID) among most recently monitored CORESETs defined in Rel-15 NR. However, the corresponding default QCL source may be defined depending on UE capability (refer to proposal 2 below).

Accordingly, in the present disclosure, the UE can receive a plurality of PDSCHs transmitted from a plurality of base stations, TRPs, panels, and/or beams based on a plurality of PDCCHs without ambiguity of (single) Rx (analog) beam configuration.

(Proposal 1-2)

Next, a method for a case in which a plurality of PDCCHs jointly schedule one PDSCH for a UE having basic UE capability will be described.

In proposal 1-2, information to be commonly applied to all PDSCH layers and information to be applied in units of a PDSCH layer group may be separately transmitted to the UE.

As an example, PDSCH common information (layer common information) may be transmitted through DCI of a specific PDCCH (e.g., using a specific DCI format), and information specific to a PDSCH layer group may be transmitted through DCI of other PDCCHs.

As another example, DCI of each PDCCH is information corresponding to each PDSCH layer group, and PDSCH layer common (layer common) information may be omitted in specific DCI, or UE operation may be defined such that the UE ignores the corresponding information.

For example, the layer common information may be a carrier and/or BWP indicator, VRB-PRB mapping information, a PRB bundling size indicator, rate matching information, ZP CSI-RS trigger information, (a part of) resource allocation information, and/or (a part of) HARQ and/or PUCCH related information (part of), and layer group specific information may be (a part of) DMRS-related information (e.g., antenna port and sequence initialization), MCS information, a new data indicator, a redundancy version, (a part of) HARQ and/or PUCCH-related information, and/or (a part of) resource allocation information.

Hereinafter, proposal 1-2 will be described by being divided into a case (proposal 1-2-1) in which a PDSCH is scheduled after a predetermined time threshold from a PDCCH transmission time in consideration of a time required for DCI decoding, a time required for beam change, and the like, and tci-PresentInDCI=ON is set, a case (proposal 1-2-2) in which a PDSCH is scheduled after the predetermined time threshold from the PDCCH transmission time, and tci-PresentInDCI=OFF is set, and a case (proposal 1-2-3) in which any one of all PDSCHs is scheduled before the predetermined time threshold.

Here, it is more desirable that the criterion for whether scheduling time exceeds the threshold be based on the last transmitted PDCCH among a plurality of PDCCHs participating in allocation of corresponding PDSCHs. For example, based on a PDCCH having the latest end symbol position among the plurality of PDCCHs, cases are classified according to whether a transmission time of the first symbol of a PDSCH exceeds the threshold as compared to the transmission time of the latest symbol of the corresponding PDCCH.

Here, with respect to the threshold to be applied, (1) a Threshold-Sched-Offset value defined and/or set in Rel-15 NR (for non-ILJT use) is commonly applied, (2) a scheduling offset value is additionally set and/or defined to be applied to a multi-PDCCH based ILJT case (e.g., a case in which a plurality of overlapping PDSCHs are scheduled, a case in which a plurality of CORESET groups are configured, or a case in which a plurality of CORESET groups are configured and PDCCHs (corresponding to specific RNTI and/or specific DCI format/type (e.g., DL grant) are received from different CORESET groups (within a certain time or simultaneously), or (3) a value (e.g., 2×Threshold-Shed-Offset) obtained by adding a specific value (set and/or indicated by the base station) to the Threshold-Sched-Offset value defined and/or set in Rel-15 NR (for non-ILJT) or multiplying the Threshold-Sched-Offset value by the specific value may be applied.

The method (2) or (3) is applied because, when the UE performs serial processing, in particular, it may take a longer time to receive a single PDCCH and to complete DCI decoding than a necessary time in order for the UE to receive multiple PDCCHs and then complete DCI decoding. Which one of (1) to (3) will be applied may depend on (reported) capability of the UE, and a value or a parameter set within the same method (e.g., a value added or multiplied in method (3)) may depend on the capability of the UE.

(Proposal 1-2-1)

Proposal 1-2-1 may be applied when a PDSCH is scheduled after a predetermined time threshold and PDSCH TCI is indicated by DCI (i.e., when tci-PresentInDCI=ON is set).

A UE obtains QCL source information according to information (e.g., TCI) included in DCI. The UE obtains QCL source information for the spatial Rx parameter as layer common information (i.e., single pieces of information) and obtains QCL source information for other QCL parameters are as layer group specific information (i.e., which may be a plurality of pieces of information).

For example, only DCI (e.g., group-common DCI, "specific DCI" in examples of proposal 1-1-1) transmitted in a specific PDCCH indicates type D QCL source information.

As another example, the UE ignores type D QCL source information indicated by the remaining DCI except for DCI (e.g., group-common DCI, "specific DCI" in examples of proposal 1-1-1) transmitted in a specific PDCCH and obtains type D QCL source information based on information indicated by the specific DCI.

As another example, the UE obtains pieces of (type D) QCL source information to be applied to respective layer groups through DCI but does not expect the occurrence of a case where the pieces of type D QCL source information do not coincide.

As another example, the UE obtains pieces of (type D) QCL source information to be applied to respective layer groups through DCI, but when the pieces of type D QCL source information do not coincide, detects a common RS in sQCL relationship with each Type D QCL source (by a chain rule) and assumes and/or sets the RS as a Type D QCL source.

In proposal 1-2-1, (when QCL sources for QCL parameters other than the spatial Rx parameter are different for respective PDSCHs), the Type D QCL source may be limitedly applied only to a specific RS type (e.g., SSB). For example, when there are (narrow beam) CSI-RS #1 and CSI-RS #2 which have been sQCLed with (wide beam) SSB #1, as shown in FIG. 18, it is more desirable that CSI-RS #1 as a Type A QCL source and SSB #1 as a Type D QCL source may be indicated for PDSCH layer group #1, and CSI-RS #2 as a Type A QCL source and SSB #1 as a Type D QCL source may be indicated for PDSCH layer group #2. That is, the Type D QCL source may be layer-commonly limited to only SSB.

Accordingly, in the present disclosure, the UE can receive a plurality of PDSCHs transmitted from a plurality of base stations, TRPs, panels, and/or beams based on a plurality of PDCCHs without ambiguity of (single) Rx (analog) beam configuration.

(Proposal 1-2-2)

Proposal 1-2-2 may be applied when a PDSCH is scheduled after a predetermined time threshold and PDSCH TCI is not indicated by DCI (i.e., when tci-PresentInDCI=OFF is set).

A UE assumes that a QCL source of each PDSCH layer group is the same as a QCL source of a PDCCH (or corresponding CORESET) containing DCI carrying corresponding PDSCH layer group specific information. If Type D QCL sources of respective PDCCHs are different, (1) the UE selects, assumes and/or applies a Type D QCL source of (specific) one PDCCH (or corresponding CORESET), or (2) the UE detects the same RS among RSs in sQCL relationship with Type D QCL sources of PDCCHs (or corresponding CORESET) and assumes and/or applies the RS as a Type D QCL source of a PDSCH.

The above proposal is a method for extending the existing method in which PDSCH TCI follows TCI of the PDCCH that schedules the corresponding PDSCH to a method for a plurality of PDCCHs such that QCL sources are different for PDSCH layer groups in the IJUT method, wherein Type D QCL sources can be layer-commonly assumed by a (basic capability) UE.

In the above description, "specific" one PDCCH may be a PDCCH in which the last (or start) symbol position is later (or earlier) or a PDCCH received in a CORESET having a larger (or smaller) number of CORESET (group) IDs.

As an example of detecting the same RS among RSs in the sQCL relationship with the Type D QCL sources of PDCCHs (or the corresponding CORESET) and assuming and/or applying the RS as a Type D QCL source of a PDSCH, if CORESET1 TCI=(CSI-RS #x, CSI-RS #x) and CORESET2 TCI=(CSI-RS #y, CSI-RS #y), CSI-RS #x and CSI-RS #y are assumed as Type A QCL sources of layer group #1 and layer group #2 for a PDSCH that jointly schedules PDCCH 1 and PDCCH 2 received in each CORESET, and SSB #z is assumed and/or set as a PDSCH layer common Type D QCL source on the assumption that SSB #z spatially QCLed with both CSI-RS #x and CSI-RS #y (by a chain rule) is present for Type D QCL sources to be commonly applied to all layer groups.

Accordingly, in the present disclosure, the UE can receive a single PDSCH transmitted from a plurality of base stations, TRPs, panels, and/or beams based on a plurality of PDCCHs without ambiguity of (single) Rx (analog) beam configuration.

(Proposal 1-2-3)

Proposal 1-2-3 may be applied when a PDSCH is scheduled before a predetermined time threshold.

A UE assumes that a (Type D) QCL source for all layers of the corresponding PDSCH is a default (Type D) QCL source.

The default QCL source may be the same as TCI (refer to default QCL information in the current NR standard described above) corresponding to the lowest CORESET ID among most recently monitored CORESETs defined in Rel-15 NR. However, the corresponding default QCL source may be defined depending on UE capability (refer to proposal 2).

Both a method of following the default QCL source even for QCL parameters other than the spatial Rx parameter (that is, non-ILJT operation in this case) and a method of separately defining and/or setting a default QCL source for each layer group can be considered. In the latter case, for example, layer group 1 may assume the QCL source of the lowest CORESET (group) ID as a default QCL source, and layer group 2 may assume the QCL source of the second lowest CORESET (group) ID as a default QCL source.

Accordingly, in the present disclosure, the UE can receive a single PDSCH transmitted from a plurality of base stations, TRPs, panels, and/or beams based on a plurality of PDCCHs without ambiguity of (single) Rx (analog) beam configuration.

Hereinafter, an operation method for an enhanced UE capable of performing reception through two or more spatial Rx parameters at the same time (using a plurality of Rx panels) will be described.

Proposal 2

Next, a method for performing ILJT operation based on a plurality of PDCCHs in the case of a UE having enhanced UE capability will be described.

Hereinafter, proposal 2 will be described by being divided into a method (proposal 2-1) for a case in which each PDCCH schedules an independent PDSCH and/or time positions of PDSCHs completely or partially overlap and a method (proposal 2-2) for a case of jointly scheduling one PDSCH, for a UE having enhanced UE capability.

Hereinafter, methods to be described are merely divided for convenience, and the configuration of a certain method may be substituted with or combined with the configuration of another method.

(Proposal 2-1)

First, a method for a case in which each PDCCH schedules an independent PDSCH and/or time positions of PDSCHs completely or partially overlap for a UE having enhanced UE capability will be described.

In the case of proposal 2-1, frequency-side positions of PDSCHs may fully or partially overlap or non-overlapped.

Hereinafter, proposal 2-1 will be described by being divided into a case (proposal 2-1-1) in which a PDSCH is scheduled after a predetermined time threshold from a PDCCH transmission time in consideration of a time required for DCI decoding, a time required for beam change, and the like, and tci-PresentInDCI=ON is set, a case (proposal 2-1-2) in which a PDSCH is scheduled after the predetermined time threshold from the PDCCH transmission time, and tci-PresentInDCI=OFF is set, and a case (proposal 2-1-3) in which any one of all PDSCHs is scheduled before the predetermined time threshold.

Here, with respect to the threshold to be applied, (1) a Threshold-Sched-Offset value defined and/or set in Rel-15 NR (for non-ILJT use) is commonly applied, (2) a scheduling offset value is additionally set and/or defined to be applied to a multi-PDCCH based ILJT case (e.g., a case in which a plurality of overlapping PDSCHs are scheduled, a case in which a plurality of CORESET groups are configured, or a case in which a plurality of CORESET groups are configured and PDCCHs (corresponding to specific RNTI and/or specific DCI format/type (e.g., DL grant) are received from different CORESET groups (within a certain time or simultaneously), or (3) a value (e.g., 2×Threshold-Shed-Offset) obtained by adding a specific value (set and/or indicated by the base station) to the Threshold-Sched-Offset value defined and/or set in Rel-15 NR (for non-ILJT) or multiplying the Threshold-Sched-Offset value by the specific value may be applied.

The method (2) or (3) is applied because, when the UE performs serial processing, in particular, it may take a longer time to receive a single PDCCH and to complete DCI decoding than a necessary time in order for the UE to receive multiple PDCCHs and then complete DCI decoding. Which one of (1) to (3) will be applied may depend on (reported) capability of the UE, and a value or a parameter set within the same method (e.g., a value added or multiplied in method (3)) may depend on the capability of the UE.
(Proposal 2-1-1)

Proposal 2-1-1 may be applied when all PDSCHs are scheduled after a predetermined time threshold and PDSCH TCI is indicated by DCI (i.e., when tci-PresentInDCI=ON is set).

A UE obtains QCL source information of each PDSCH from DCI of a PDCCH that schedules the PDSCH.

In addition, when X or more different pieces of sQCL source information are indicated to a UE capable of simultaneously receiving signals and/or channels having a maximum of X different sQCL sources, the UE may select only X pieces of DCI by a specific (prioritization) rule to obtain corresponding sQCL information and ignore the remaining sQCL source information.

Accordingly, in the present disclosure, the UE can receive a plurality of PDSCHs transmitted from a plurality of base stations, TRPs, panels, and/or beams based on a plurality of PDCCHs without ambiguity of Rx (analog) beam configuration (for each reception panel).
(Proposal 2-1-2)

Proposal 2-1-2 may be applied when all PDSCHs are scheduled after a predetermined time threshold and PDSCH TCI is not indicated by DCI (i.e., when tci-PresentInDCI=OFF is set).

A UE assumes that a QCL source of each PDCCH (CORESET) corresponds to a QCL source of a PDSCH scheduled by the PDCCH.

In addition, when X or more different pieces of sQCL source information are indicated to a UE capable of simultaneously receiving signals and/or channels having a maximum of X different sQCL sources, the UE may select only X PDCCHs (or CORESET) by a specific (prioritization) rule to obtain corresponding sQCL information and ignore the remaining sQCL source information Accordingly, in the present disclosure, the UE can receive a plurality of PDSCHs transmitted from a plurality of base stations, TRPs, panels, and/or beams based on a plurality of PDCCHs without ambiguity of Rx (analog) beam configuration (for each reception panel).
(Proposal 2-1-3)

Proposal 2-1-3 may be applied when any one of all PDSCHs is scheduled before a predetermined time threshold.

When a specific PDSCH is scheduled before a predetermined time threshold, a default TCI is applied and/or assumed in reception of the PDSCH. Here, a plurality of default TCIs may be defined and/or set for an enhanced UE (according to the number of UE reception panels and/or beams), and which one of the plurality of default TCIs will be applied per CORESET may be defined and/or set.

(At least) one of the plurality of default TCIs may refer to TCI (default QCL information in the current NR standard described above) corresponding to the lowest CORESET ID among most recently monitored CORESETs defined in Rel-15 NR.

When default TCI is defined and/or set as, for example, CORESET1→lowest CORESET ID, CORESET2→second lowest CORESET ID, the UE buffers one received beam and/or panel in accordance with a Type D QCL source indicated by TCI of the lowest CORESET ID, buffers another received beam and/or panel in accordance with a Type D QCL source indicated by TCI of the second lowest CORESET ID, demodulates PDSCH1 through the received signal buffered with the TCI of the lowest CORESET ID if a PDSCH scheduled by CORESET1 is allocated within a threshold (which is a time required for beam switching after DCI decoding), and demodulates PDSCH2 through the received signal buffering with the TCI of the second lowest CORESET ID if a PDSCH scheduled by CORESET2 is allocated within the threshold (which is the time required for beam switching after DCI decoding).

In addition to the aforementioned method, in the case of proposal 2-1-3, a single default TCI may be defined and/or set for all PDSCHs to perform non-IJUT operation.

Accordingly, in the present disclosure, the UE can receive a plurality of PDSCHs transmitted from a plurality of base stations, TRPs, panels, and/or beams based on a plurality of PDCCHs without ambiguity of Rx (analog) beam configuration (for each reception panel).
(Proposal 2-2)

Next, a method for a case in which a plurality of PDCCHs jointly schedule one PDSCH for a UE having enhanced UE capability will be described.

In proposal 2-2, information to be commonly applied to all PDSCH layers and information to be applied in units of a PDSCH layer group may be separately transmitted to a UE.

As an example, PDSCH common information (layer common information) may be transmitted through DCI of a specific PDCCH (e.g., using a specific DCI format), and information specific to a PDSCH layer group may be transmitted through DCI of other PDCCHs.

As another example, DCI of each PDCCH is information corresponding to each PDSCH layer group, PDSCH layer common information may be omitted in specific DCI, or UE operation may be defined such that the UE ignores the corresponding information. For example, layer common information may be a carrier and/or BWP indicator, VRB-PRB mapping information, a PRB bundling size indicator, rate matching information, ZP CSI-RS trigger information, (a part of) resource allocation information, and/or (a part of) HARQ and/or PUCCH related information, and layer group specific information may be (a part of) DMRS-related information (e.g., antenna port, sequence initialization), MCS information, a new data indicator (NDI), a redundancy version (RV), (a part of) HARQ and/or PUCCH-related information, and/or (a part of) resource allocation information.

Hereinafter, proposal 2-2 will be described by being divided into a case (proposal 2-2-1) in which a PDSCH is scheduled after a predetermined time threshold from a PDCCH transmission time in consideration of a time required for DCI decoding, a time required for beam change, and the like, and tci-PresentInDCI=ON is set, a case (proposal 2-2-2) in which a PDSCH is scheduled after the predetermined time threshold from the PDCCH transmission time, and tci-PresentInDCI=OFF is set, and a case (proposal 2-2-3) in which any one of all PDSCHs is scheduled before the predetermined time threshold.

Here, it is more desirable that the criterion for whether scheduling time exceeds the threshold be based on the last transmitted PDCCH among a plurality of PDCCHs participating in allocation of corresponding PDSCHs. For example, based on a PDCCH having the latest end symbol position among the plurality of PDCCHs, cases are classified according to whether a transmission time of the first symbol of a PDSCH exceeds the threshold as compared to the transmission time of the latest symbol of the corresponding PDCCH. Here, with respect to the threshold to be applied, (1) a Threshold-Sched-Offset value defined and/or set in Rel-15 NR (for non-ILJT use) is commonly applied, (2) a scheduling offset value is additionally set and/or defined to be applied to a multi-PDCCH based ILJT case (e.g., a case in which a plurality of overlapping PDSCHs are scheduled, a case in which a plurality of CORESET groups are configured, or a case in which a plurality of CORESET groups are configured and PDCCHs (corresponding to specific RNTI and/or specific DCI format/type (e.g., DL grant) are received from different CORESET groups (within a certain time or simultaneously), or (3) a value (e.g., 2×Threshold-Shed-Offset) obtained by adding a specific value (set and/or indicated by the base station) to the Threshold-Sched-Offset value defined and/or set in Rel-15 NR (for non-ILJT) or multiplying the Threshold-Sched-Offset value by the specific value may be applied.

The method (2) or (3) is applied because, when the UE performs serial processing, in particular, it may take a longer time to receive a single PDCCH and to complete DCI decoding than a necessary time in order for the UE to receive multiple PDCCHs and then complete DCI decoding. Which one of (1) to (3) will be applied may depend on (reported) capability of the UE, and a value or a parameter set within the same method (e.g., a value added or multiplied in method (3)) may depend on the capability of the UE.
(Proposal 2-2-1)

Proposal 2-2-1 may be applied when a PDSCH is scheduled after a predetermined time threshold and PDSCH TCI is indicated by DCI (i.e., when tci-PresentInDCI=ON is set).

A UE obtains QCL source information to be applied to each layer group from single DCI or a plurality of pieces of DCI.

As an example of DCI configuration, a specific TCI state may indicate QCL source information to be applied to each of a plurality of layer groups (e.g., TCI state→(Type A QCL source for layer group #1, Type A QCL source for layer group #2, Type D QCL source for layer group #1, Type D QCL source for layer group #2)).

As another example of DCI configuration, a plurality of TCI states are indicated to a UE through a plurality of pieces of DCI, and each TCI state may indicate QCL source information to be applied to a specific layer group (e.g., TCI state from DCI #1→(Type A QCL source for layer group #1, Type D QCL source for layer group #1), TCI state from DCI #2 (Type A QCL source for layer group #2, Type D QCL source for layer group #2)).

In addition, when X or more different pieces of sQCL source information are indicated to a UE capable of simultaneously receiving signals and/or channels having a maximum of X different sQCL sources, the UE may select only X pieces of DCI by a specific (prioritization) rule to obtain corresponding sQCL information and ignore the remaining sQCL source information.

Accordingly, in the present disclosure, the UE can receive a single PDSCH transmitted from a plurality of base stations, TRPs, panels, and/or beams based on a plurality of PDCCHs without ambiguity of Rx (analog) beam configuration (for each reception panel).
(Proposal 2-2-2)

Proposal 2-2-2 may be applied when a PDSCH is scheduled after a predetermined time threshold and PDSCH TCI is not indicated by DCI (i.e., when tci-PresentInDCI=OFF is set).

A UE assumes that a QCL source of each PDSCH layer group is the same as a QCL source of a PDCCH (or corresponding CORESET) containing DCI carrying corresponding PDSCH layer group specific information.

The above-described proposal is a method for extending the existing method in which PDSCH TCI follows TCI of a PDCCH that schedules the corresponding PDSCH to a method for a plurality of PDCCHs such that QCL sources are different for PDSCH layer groups in IJUT.

In addition, when X or more different pieces of sQCL source information are indicated to a UE capable of simultaneously receiving signals and/or channels having a maximum of X different sQCL sources, the UE may select only X PDCCHs (or CORESETs) by a specific (prioritization) rule to obtain corresponding sQCL information and ignore the remaining sQCL source information.

Accordingly, in the present disclosure, the UE can receive a single PDSCH transmitted from a plurality of base stations, TRPs, panels, and/or beams based on a plurality of PDCCHs without ambiguity of Rx (analog) beam configuration (for each reception panel).
(Proposal 2-2-3)

Proposal 2-2-3 may be applied when a PDSCH is scheduled before a predetermined time threshold.

Proposal 2-2-3 applies and/or assumes a default TCI in the reception of the corresponding PDSCH. Here, a default TCI to be applied for each layer group may be separately defined and/or set for an enhanced UE (according to the number of UE reception panels/beams).

(At least) one of the plurality of default TCIs may refer to TCI (default QCL information in the current NR standard described above) corresponding to the lowest CORESET ID among most recently monitored CORESETs defined in Rel-15 NR.

For example, after defining and/or setting the default TCI for each CORESET, a default TCI defined and/or set in the corresponding CORESET may be applied when the corresponding layer group is received according to a CORESET position at which a PDCCH containing layer group specific information is received.

In addition to the above-described method, in the case of proposal 2-2-3, a single default TCI may be defined and/or set for all layers to perform non-IJUT operation.

Accordingly, in the present disclosure, the UE can receive a single PDSCH transmitted from a plurality of base stations, TRPs, panels, and/or beams based on a plurality of PDCCHs without ambiguity of Rx (analog) beam configuration (for each reception panel).
Proposal 3

Next, a method for improving power consumption by simultaneously tracking a plurality of default beams will be described.

Hereinafter, methods to be described are merely divided for convenience, and the configuration of a certain method may be substituted with or combined with the configuration of another method.

When a UE supports a plurality of default beams (or a plurality of default CORESETs), considerable power consumption may occur because the UE needs to perform data buffering using a plurality of default beams simultaneously.

To improve this, the UE (e.g., a basic UE or an enhanced UE) can be configured to perform data buffering only on a specific CORESET group (e.g., a specific TRP) by a request of the UE or an instruction of a base station even in a state in which a plurality of default beams is enabled or set. Alternatively, default beams may not be used for all CORESET groups.

Hereinafter, specific methods (proposals 3-1 to 3-4) with respect to this will be described.

In addition to the above-described proposed methods (e.g., proposals 1 to 2), the following proposed methods may be performed when a multi-PDCCH based NCJT transmission mode is set. Alternatively, when the multi-PDCCH based NCJT transmission mode is set, the following proposed methods may be performed according to UE capability or regardless of UE capability.

(Proposal 3-1)

A PDSCH scheduled by each PDCCH may be defined such that it is always scheduled after a scheduling offset. That is, a UE for which multi-PDCCH based NCJT transmission has been set (or a UE for which a plurality of CORESET groups has been set) does not expect that the PDSCH will be scheduled before the scheduling offset (when tci-PresentInDCI=ON). When this method is applied, there may be no problem in receiving a plurality of PDSCHs regardless of which default beam (set) is used for the UE to perform buffering.

The above-described method applies scheduling restriction to all TRPs and/or panels and thus UE operation is simplified, but scheduling flexibility is excessively limited.

(Proposal 3-2)

And/or, a method for applying the above-described method (proposal 3-1) only to specific TRP(s) and/or panel(s) may also be considered. That is, a UE for which multi-PDCCH based NCJT transmission has been set (or a UE for which a plurality of CORESET groups has been set) does not expect that a PDSCH will be scheduled before the scheduling offset for specific CORESET group(s) (or except for specific CORESET group(s)) (when tci-PresentInDCI=ON).

As an example of the specific CORESET group(s), for CORESET group(s) other than CORESET groups including CORESET #0 or a default CORESET (e.g., CORESET group #0/CORESET group with CORESET group ID=0), a case in which the PDSCH is scheduled before the scheduling offset may not be considered. In other words, the specific CORESET group(s) may be, for example, CORESET group(s) other than CORESET groups including CORESET #0 or the default CORESET (e.g., CORESET group #0/CORESET group with CORESET group ID=0).

In the case of a TRP and/or a panel using a CORESET group including the default CORESET, even if a PDSCH is scheduled within the scheduling offset, it is only necessary to operate and/or implement the previously defined operation, and thus a case in which a PDSCH is scheduled within the scheduling offset is permitted for the corresponding CORESET group (that is, CORESET group including the default CORESET), and in the case of the remaining CORESET group(s), the PDSCH is always scheduled after the scheduling offset such that the UE can operate regardless of buffering implementation of the UE (e.g., whether the existing CORESET TCI is used or another CORESET TCI is used). For example, in the case of the CORESET group including the default CORESET, the default CORESET can be used even if the PDSCH is scheduled within the scheduling offset, and thus scheduling of the PDSCH within the scheduling offset is permitted and the PDSCH is scheduled after the scheduling offset for the remaining CORESET groups.

For example, if the PDSCH is scheduled within an offset (or scheduling offset), the UE may process it as an error case. For example, if the PDSCH is scheduled within the offset (or scheduling offset), the UE regards it as an error case and ignores the corresponding DCI.

(Proposal 3-3)

And/or, the UE can expect that tci-PresentInDCI=ON will be set only for CORESETs of a maximum of N CORESET groups. N is determined according to the number of simultaneously receivable panels of the UE but may be additionally reported as capability. For example, in the case of a single RX panel UE, N=1. In this case, when CORESET groups 0 and 1 are set for the UE, tci-PresentInDCI=ON is set in only one of these CORESET groups, and thus the CORESET of the CORESET group can use the default CORESET, and CORESET of the CORESET group in which tci-PresentInDCI=OFF does not use the default CORESET and follows the existing Rel-15 operation.

(Proposal 3-4)

And/or, a UE performs an operation using the default CORESET for one CORESET group (e.g., the first group) but does not use the default CORESET for the CORESET of another CORESET group (e.g., the second group) even when a PDSCH is scheduled within the scheduling offset, and ignores TCI field information of DCI and receives the PDSCH using a QCL reference signal (RS) of the corresponding CORESET (e.g., QCL RS of a TCI state set in the CORESET). In the present disclosure, "QCL RS" may be referred to as a "spatial QCL reference signal".

For example, the UE may perform buffering using a QCL RS of the default CORESET when tci-PresentInDCI=ON is set for CORESET of one CORESET group, and for CORESET of another CORESET group, ignore DCI even when tci-PresentInDCI=ON is set and receive PDSCH using the QCL RS of the corresponding CORESET without using the default CORESET.

And/or, the CORESET group which will use the default CORESET may be fixed to a CORESET group (lowest ID CORESET group) having the smallest identifier (ID), selected by a UE and reported to a base station, or indicated by the base station to the UE. For example, the UE may report one or more CORESET groups which will use the default CORESET to the base station or they may be indicated by the base station. And/or, all of the CORESET groups reported or indicated in this manner may use the same default CORESET.

As the scheduling offset mentioned in the above-described proposals 3-1 to 3-4, (1) a Threshold-Sched-Offset value defined and/or set in Rel-15 NR (for non-ILJT use) may be commonly applied, (2) a scheduling offset value additionally set and/or defined to be applied to multi-PDCCH based ILJT cases (that is, when a plurality of overlapping PDSCHs is scheduled) may be used, or (3) a specific value (defined or set/indicated by the base station) may be added to the Threshold-Sched-Offset value defined and/or set in Rel-15 NR (for non-ILJT purposes) in the above case or multiplied thereby and applied (e.g., 2×Threshold-Sched-Offset).

The CORESET group ID mentioned in the above-described proposals 3-1 to 3-4 may mean an index and/or identification information (e.g., ID) for identifying a CORESET for each TRP and/or panel. And/or, a CORESET group may be a group and/or a union of CORESETs identified by indexes and/or identification information (e.g., ID) for identifying CORESETs for each TRP and/or panel, the CORESET group ID, and the like. For example, the CORESET group ID may be specific index information defined in CORESET configuration. As an example, a CORESET group may be set, indicated, and/or defined by an index defined in CORESET configuration for each CORESET. And/or CORESET group ID may mean an index/identification information/indicator for classification/identification between CORESETs set in and/or associated with each TRP and/or panel.

And/or the CORESET group ID described/mentioned in the present disclosure may be replaced with a specific index/specific identification information/specific indicator for classification/identification between CORESETs set in/associated with each TRP and/or panel.

The CORESET group ID may be set/indicated through higher layer signaling (e.g., RRC signaling)/L2 signaling (e.g., MAC-CE)/L1 signaling (e.g., DCI). That is, a specific index/specific identification information/specific indicator for classification/identification between CORESETs set in/associated with each TRP/panel may be set/indicated through higher layer signaling (e.g., RRC signaling)/L2 signaling (e.g., MAC-CE))/L1 signaling (e.g., DCI).

As an example, PDCCH detection for each TRP and/or panel may be configured/instructed to be performed in units of the corresponding CORESET group. And/or uplink control information (e.g., CSI, HARQ-A/N, and SR) and/or uplink physical channel resources (e.g., PUCCH/PRACH/SRS resources) may be configured/instructed to be separately managed/controlled for each TRP and/or panel in units of the corresponding CORESET group. And/or HARQA/N (process/retransmission) for a PDSCH/PUSCH and the like scheduled for each TRP and/or panel may be managed in units of the corresponding CORESET group.

In application of the above-described proposed methods, a UE and a base station may perform the following operation procedures.

Step 1: DL/UL Beam Management Procedure

This is a process of matching a DL transmission/reception beam pair and a UL transmission/reception beam pair between the base station and the UE (refer to "Beam management" for details).

The present disclosure assumes that a plurality of base stations, TRPs, and/or panels may participate in this process (e.g., best beam pair(s) are aligned between each TRP and the corresponding UE).

Step 2: DL CSI Acquisition Procedure

When the base station transmits a CSI-RS for specific (serving) DL beam pair(s) (based on the beam pair aligned in Step 1), the UE performs CSI reporting (refer to "CSI related procedures" for details).

The present disclosure assumes that a plurality of base stations, TRPs, and/or panels may participate in this process (e.g., CSI acquisition for the best beam pair between each TRP and the corresponding UE is performed).

Step 3: PDCCH Transmission and Reception Procedure for PDSCH Assignment

This is a procedure in which the base station transmits DL DCI containing a PDSCH transmission resource location and MCS, antenna port information, HARQ-related information, and the like to the UE (based on CSI obtained by (each) base station in step 2).

The present disclosure assumes that a plurality of base stations, TRPs, panels, and/or beams participate in this procedure, and a plurality of PDCCHs is transmitted to the UE (e.g., one PDCCH is transmitted per base station, TRP, panel, and/or beam).

In proposals 1-1 and 2-1, it is assumed that each PDCCH assigns a separate PDSCH. In this case, it is assumed that symbol positions at which each PDSCH is transmitted (fully or partially) overlap. In proposals 1-2 and 2-2, it is assumed that a plurality of PDCCHs (jointly) assign a single PDSCH.

Step 4: PDSCH Transmission/Reception Procedure

When the base station transmits a PDSCH according to PDSCH assignment information in the DL DCI transmitted and received in step 3, the UE receive the PDSCH.

In the present disclosure, it is assumed that a plurality of PDSCHs are transmitted to the UE, and different base stations, TRPs, panels, and/or beams (beam sets) may participate in transmission of the respective PDSCHs in proposals 1-1 and 2-1.

However, in the present disclosure, it is assumed that proposal 1-1 may be limitedly applied when (analog) beams participating in transmission are identical or beam directions are similar for all PDSCHs (when sQCLed sources are the same RS).

In the example of proposal 1-1, base station and/or UE operations according to whether the time-side positions of assigned PDSCHs are within a specific time threshold with respect to a PDCCH and whether TCI information of a PDSCH is indicated through DCI have been proposed.

However, in the case of proposal 2-1 in the present disclosure, it is assumed that (analog) beams participating in transmission may be different for all PDSCHs.

In the example of proposal 2-1, base station and/or UE operations according to whether the time-side position of an assigned PDSCH is within a specific time threshold with respect to a PDCCH and whether TCI information of a PDSCH is indicated through DCI have been proposed.

In the present disclosure, it is assumed that a single PDSCH is transmitted to a UE, and different base stations, TRPs, panels, and/or beams (beam sets) may participate in transmission for respective layer groups for a plurality of layers constituting a PDSCH in proposals 1-2 and 2-2.

However, in the present disclosure, it is assumed that proposal 1-2 may be limitedly applied when (analog) beams participating in transmission are identical or beam directions are similar (when sQCLed sources are the same RS) for all layer groups.

In the example of proposal 1-2, base station and/or UE operations according to whether the time-side positions of assigned PDSCHs are within a specific time threshold with respect to a PDCCH and whether TCI information of a PDSCH is indicated through DCI have been proposed.

However, in the present disclosure, it is assumed that (analog) beams participating in transmission may be different for all layer groups in the case of proposal 2-2.

In the example of proposal 2-2, base station and/or UE operations according to whether the time-side position of an assigned PDSCH is within a specific time threshold with respect to a PDCCH and whether TCI information of a PDSCH is indicated through DCI have been proposed.

Step 5: HARQ Procedure

It is determined whether or not the PDSCH is successively received in step 4, ACK information is configured when the reception is successful (in units of a CBG, codeword, and/or TB), NACK information is configured when the reception fails, and then the corresponding information is transmitted to the base station through a PUCCH resource specified in step 3 or a PUSCH resource assigned through an additional procedure.

The methods proposed in the present disclosure may affect only step 3 and step 4 in the standard document. In other words, steps 1, 2, and/or 5 may be implemented using the existing standard technology, and the order of performing the corresponding procedures may be changed in implementation (e.g., step 1 is performed for beam readjustment after step 2 is performed).

FIG. 19 is a flowchart for describing an operation method of a UE proposed in the present disclosure.

Referring to FIG. 19, first, a UE (1000/2000 in FIGS. 21 to 25) may receive configuration information (e.g., PDCCH-Config, controlResourceSetToAddModList, and controlResourceSetToAddModList2) on a control resource set (CORESET) of a first group and a CORESET of a second group (S1901). For example, each group may include one or more CORESETs. For example, the first group and the second group may be identified or indicated by CORESET group identifiers (e.g., coresetPoolIndex). For example, the first group and the second group may be set to the same default CORESET.

For example, the operation of the UE to receive the configuration information in step S1901 may be implemented by a device of FIGS. 21 to 25 which will be described below. For example, referring to FIG. 22, one or more processors 1020 may control one or more memories 1040 and/or one or more RF units 1060 to receive the configuration information, and the one or more RF units 1060 may receive the configuration information.

And/or, the UE (1000/2000 in FIGS. 21 to 25) may receive a first physical downlink control channel (PDCCH) in the CORESET of the first group (S1902). For example, the first PDCCH may be a PDCCH that schedules a first PDSCH.

For example, the operation of the UE to receive the first PDCCH in step S1902 may be implemented by a device of FIGS. 21 to 25 which will be described below. For example, referring to FIG. 22, one or more processors 1020 may control one or more memories 1040 and/or one or more RF units 1060 to receive the first PDCCH, and the one or more RF units 1060 may receive the first PDCCH.

And/or, the UE (1000/2000 in FIGS. 21 to 25) may receive a first physical downlink shared channel (PDSCH) based on the first PDCCH (S1903).

For example, at least one of the first PDCCH and/or a second PDCCH which will be described below may include information related to a spatial (spatial) quasi-co-location (QCL) reference signal of a PDSCH scheduled thereby. For example, the information related to the spatial QCL reference signal may be transmission configuration indication (TCI) information indicated by a PDCCH. The corresponding TCI information may include a spatial QCL reference signal used for PDSCH reception.

For example, the operation of the UE to receive the first PDSCH in step S1903 may be implemented by a device of FIGS. 21 to 25 which will be described below. For example, referring to FIG. 22, one or more processors 1020 may control one or more memories 1040 and/or one or more RF units 1060 to receive the first PDSCH, and the one or more RF units 1060 may receive the first PDSCH.

And/or, the UE (1000/2000 in FIGS. 21 to 25) may receive the second PDCCH in the CORESET of the second group (S1904). For example, the second PDCCH may be a PDCCH that schedules a second PDSCH. For example, the first PDCCH may be received using a spatial QCL reference signal of the CORESET of the first group, and the second PDCCH may be received using a spatial QCL reference signal of the CORESET of the second group.

For example, the operation of the UE to receive the second PDCCH in step S1904 may be implemented by a device of FIGS. 21 to 25 which will be described below. For example, referring to FIG. 22, one or more processors 1020 may control one or more memories 1040 and/or one or more RF units 1060 to receive the second PDCCH, and the one or more RF units 1060 may receive the second PDCCH.

And/or, the UE (1000/2000 in FIGS. 21 to 25) may receive the second PDSCH based on the second PDCCH (S1905).

For example, the operation of the UE to receive the second PDSCH in step S1905 may be implemented by a device of FIGS. 21 to 25 which will be described below. For example, referring to FIG. 22, one or more processors 1020 may control one or more memories 1040 and/or one or more RF units 1060 to receive the second PDSCH, and the one or more RF units 1060 may receive the second PDSCH.

In particular, at least one of the first PDSCH and the second PDSCH may be received using a default CORESET when scheduled within a scheduling offset. For example, the scheduling offset (e.g., a Threshold-Sched-Offset value) may mean a time necessary to change beams based on information related to a spatial QCL reference signal included in a PDCCH.

For example, at least one (e.g., the first PDSCH and/or the second PDSCH) may be received using a spatial QCL reference signal of the default CORESET. And/or, information related to a spatial QCL reference signal of a scheduled PDSCH may be included in a scheduling PDCCH, and information related to at least one spatial QCL reference signal may be ignored.

For example, the first PDSCH may be received using a spatial QCL reference signal of the default CORESET upon scheduling of the first PDSCH by the first PDCCH within the scheduling offset, and the first PDSCH may be received using a spatial QCL reference signal according to the first PDCCH upon scheduling of the first PDSCH by the first PDCCH after the scheduling offset. And/or, the second PDSCH may be received using the spatial QCL reference signal of the default CORESET upon scheduling of the second PDSCH by the second PDCCH within the scheduling offset, and the second PDSCH may be received using the spatial QCL reference signal according to the second PDCCH upon scheduling of the second PDSCH by the second PDCCH after the scheduling offset.

For example, upon scheduling of the first PDSCH and the second PDSCH within the scheduling offset, the first PDSCH and the second PDSCH may be received using the spatial QCL reference signal of the same default CORESET.

And/or, the first PDSCH may be received in a resource scheduled by the first PDCCH, and the second PDSCH may be received in a resource scheduled by the second PDCCH.

And/or, the first PDCCH and/or the second PDSCH may be received from a transmission and reception point (TRP), panel, beam or spatial (spatial) QCL reference signal different from that of the second PDCCH and/or the second PDSCH. For example, the first PDCCH and/or the first PDSCH may be transmitted from a first TRP, and the second PDCCH and/or the second PDSCH may be transmitted from a second TRP. For example, the first group and the second group may correspond to different transmission and reception points (TRPs), panels, beams, and/or spatial QCL reference signals.

And/or, the UE may be a UE that simultaneously supports a plurality of beams or spatial (spatial) QCL reference signals.

And/or, the UE (1000/2000 in FIGS. 21 to 25) may report information on a group using the default CORESET between the first group and the second group to the base station. For example, the information on a group using the default CORESET may be one or more groups. For example, the UE may report the first group and the second group to the base station as groups using the default CORESET. And/or, the first group and the second group using the default CORESET reported to the base station may use the same default CORESET.

For example, the operation of the UE to report information on a group using the default CORESET may be implemented by a device of FIGS. 21 to 25 which will be described below. For example, referring to FIG. 22, one or more processors 1020 may control one or more memories 1040 and/or one or more RF units 1060 to report information on a group using the default CORESET, and the one or more RF units 1060 may report information on a group using the default CORESET.

Since the operation of the UE described with reference to FIG. 19 is the same as that of the UE described with reference to FIGS. 1 to 18 (e.g., proposals 1 to 3), additional detailed description is omitted.

The above-described signaling and operation may be implemented by a device (e.g., FIGS. 21 to 25) which will be described below. For example, the above-described signaling and operation may be processed by one or more processors 1010 and 2020 of FIGS. 21 to 25, and the above-described signaling and operation may be stored in a memory (e.g., 1040 and 2040) in the form of an instruction/program (e.g., instruction and executable code) for driving at least one processor (e.g., 1010 and 2020) of FIGS. 21 to 25.

For example, in a device including one or more memories and one or more processors operatively coupled to the one or more memories, the one or more processors may be configured such that the device receives configuration information on a control resource set (CORESET) of a first group and a CORESET of a second group, receives a first physical downlink control channel (PDCCH) in the CORESET of the first group, receives a first physical downlink shared channel (PDSCH) based on the first PDCCH, receives a second PDCCH in the CORESET of the second group, and receives a second PDSCH based on the second PDCCH, wherein at least one of the first PDSCH and the second PDSCH may be received using a default CORESET upon scheduling thereof within a scheduling offset.

As another example, in a non-transitory computer-readable medium (CRM) for storing one or more instructions, one or more instructions executable by one or more processors causes a UE to receive configuration information on a control resource set (CORESET) of a first group and a CORESET of a second group, to receive a first physical downlink control channel (PDCCH) in the CORESET of the first group, to receive a first physical downlink shared channel (PDSCH) based on the first PDCCH, to receive a second PDCCH in the CORESET of the second group, and to receive a second PDSCH based on the second PDCCH, wherein at least one of the 1 PDSCH and the second PDSCH may be received using a default CORESET upon scheduling thereof within a scheduling offset.

FIG. 20 is a flowchart for describing an operation method of a base station proposed in the present disclosure.

Referring to FIG. 20, first, a base station (1000/2000 in FIGS. 21 to 25) may transmit configuration information (e.g., PDCCH-Config, controlResourceSetToAddModList, and controlResourceSetToAddModList2) on a control resource set (CORESET) of a first group and a CORESET of a second group to a UE (S2001). For example, each group may include one or more CORESETs. For example, the first group and the second group may be identified or indicated by CORESET group identifiers (e.g., coresetPoolIndex). For example, the first group and the second group may be set to the same default CORESET.

For example, the operation of the base station to transmit the configuration information in step S2001 may be implemented by a device of FIGS. 21 to 25 which will be described below. For example, referring to FIG. 22, one or more processors 1020 may control one or more memories 1040 and/or one or more RF units 1060 to transmit the configuration information, and the one or more RF units 1060 may transmit the configuration information.

And/or, the base station (1000/2000 in FIGS. 21 to 25) may transmit a first physical downlink control channel (PDCCH) to the UE in the CORESET of the first group (S2002). For example, the first PDCCH may be a PDCCH that schedules a first PDSCH.

For example, the operation of the base station to transmit the first PDCCH in step S2002 may be implemented by a device of FIGS. 21 to 25 which will be described below. For example, referring to FIG. 22, one or more processors 1020 may control one or more memories 1040 and/or one or more RF units 1060 to transmit the first PDCCH, and the one or more RF units 1060 may transmit the first PDCCH.

And/or, the base station (1000/2000 in FIGS. 21 to 25) may transmit a first physical downlink shared channel (PDSCH) to the UE based on the first PDCCH (S2003).

For example, at least one of the first PDCCH and/or a second PDCCH which will be described below may include information related to a spatial (spatial) quasi-co-location (QCL) reference signal of a PDSCH scheduled thereby. For example, the information related to the spatial QCL reference signal may be transmission configuration indication (TCI) information indicated by a PDCCH. The corresponding TCI information may include a spatial QCL reference signal used for PDSCH reception.

For example, the operation of the base station to transmit the first PDSCH in step S2003 may be implemented by a device of FIGS. 21 to 25 which will be described below. For example, referring to FIG. 22, one or more processors 1020 may control one or more memories 1040 and/or one or more RF units 1060 to transmit the first PDSCH, and the one or more RF units 1060 may transmit the first PDSCH.

And/or, the base station (1000/2000 in FIGS. 21 to 25) may transmit the second PDCCH to the UE in the CORESET of the second group (S2004). For example, the second PDCCH may be a PDCCH that schedules a second PDSCH. For example, the first PDCCH may be received using a spatial QCL reference signal of the CORESET of the first group, and the second PDCCH may be received using a spatial QCL reference signal of the CORESET of the second group.

For example, the operation of the base station to transmit the second PDCCH in step S2004 may be implemented by a device of FIGS. 21 to 25 which will be described below. For example, referring to FIG. 22, one or more processors 1020 may control one or more memories 1040 and/or one or more RF units 1060 to transmit the second PDCCH, and the one or more RF units 1060 may transmit the second PDCCH.

And/or, the base station (1000/2000 in FIGS. 21 to 25) may transmit the second PDSCH to the UE based on the second PDCCH (S2005).

For example, the operation of the base station to transmit the second PDSCH in step S2005 may be implemented by a device of FIGS. 21 to 25 which will be described below. For example, referring to FIG. 22, one or more processors 1020 may control one or more memories 1040 and/or one or more RF units 1060 to transmit the second PDSCH, and the one or more RF units 1060 may transmit the second PDSCH.

In particular, at least one of the first PDSCH and the second PDSCH may be transmitted using a default CORESET upon scheduling thereof within a scheduling offset. For example, the scheduling offset (e.g., a Threshold-SchedOffset value) may mean a time necessary to change beams based on information related to a spatial QCL reference signal included in a PDCCH.

For example, at least one (e.g., the first PDSCH and/or the second PDSCH) may be received using a spatial QCL reference signal of the default CORESET. And/or, information related to a spatial QCL reference signal of a scheduled PDSCH may be included in a scheduling PDCCH, and information related to at least one spatial QCL reference signal may be ignored.

For example, the first PDSCH may be transmitted using a spatial QCL reference signal of the default CORESET upon scheduling of the first PDSCH by the first PDCCH within the scheduling offset, and the first PDSCH may be transmitted using a spatial QCL reference signal according to the first PDCCH upon scheduling of the first PDSCH by the first PDCCH after the scheduling offset. And/or, the second PDSCH may be transmitted using the spatial QCL reference signal of the default CORESET upon scheduling of the second PDSCH by the second PDCCH within the scheduling offset, and the second PDSCH may be transmitted using the spatial QCL reference signal according to the second PDCCH upon scheduling of the second PDSCH by the second PDCCH after the scheduling offset.

For example, upon scheduling of the first PDSCH and the second PDSCH within the scheduling offset, the first PDSCH and the second PDSCH may be transmitted using the spatial QCL reference signal of the same default CORESET.

And/or, the first PDSCH may be transmitted in a resource scheduled by the first PDCCH, and the second PDSCH may be transmitted in a resource scheduled by the second PDCCH.

And/or, the first PDCCH and/or the second PDSCH may be transmitted from a transmission and reception point (TRP), panel, beam or spatial (spatial) QCL reference signal different from that of the second PDCCH and/or the second PDSCH. For example, the first PDCCH and/or the first PDSCH may be transmitted from a first TRP, and the second PDCCH and/or the second PDSCH may be transmitted from a second TRP. For example, the first group and the second group may correspond to different transmission and reception points (TRPs), panels, beams, and/or spatial QCL reference signals.

And/or, the UE may be a UE that simultaneously supports a plurality of beams or spatial (spatial) QCL reference signals.

And/or, the base station (1000/2000 in FIGS. 21 to 25) may receive information on a group using the default CORESET between the first group and the second group from the UE. For example, the information on a group using the default CORESET may be one or more groups. For example, the base station may receive the first group and the second group from the UE as groups using the default CORESET. And/or, the first group and the second group using the default CORESET reported to the base station may use the same default CORESET.

For example, the operation of the base station to receive information on a group using the default CORESET may be implemented by a device of FIGS. 21 to 25 which will be described below. For example, referring to FIG. 22, one or more processors 1020 may control one or more memories 1040 and/or one or more RF units 1060 to receive information on a group using the default CORESET, and the one or more RF units 1060 may receive information on a group using the default CORESET.

Since the operation of the base station described with reference to FIG. 20 is the same as that of the base station described with reference to FIGS. 1 to 19 (e.g., proposals 1 to 3), additional detailed description is omitted.

The above-described signaling and operation may be implemented by a device (e.g., FIGS. 21 to 25) which will be described below. For example, the above-described signaling and operation may be processed by one or more processors 1010 and 2020 of FIGS. 21 to 25, and the above-described signaling and operation may be stored in a memory (e.g., 1040 and 2040) in the form of an instruction/program (e.g., instruction and executable code) for driving at least one processor (e.g., 1010 and 2020) of FIGS. 21 to 25.

For example, in a device including one or more memories and one or more processors operatively coupled to the one or more memories, the one or more processors may be configured such that the device transmits configuration information on a control resource set (CORESET) of a first group and a CORESET of a second group to a UE, transmits a first physical downlink control channel (PDCCH) to the UE in the CORESET of the first group, transmits a first physical downlink shared channel (PDSCH) to the UE based on the first PDCCH, transmits receives-a second PDCCH to the UE in the CORESET of the second group, and transmits a second PDSCH to the UE based on the second PDCCH, wherein at least one of the first PDSCH and the second PDSCH may be transmitted using a default CORESET upon scheduling thereof within a scheduling offset.

As another example, in a non-transitory computer-readable medium (CRM) for storing one or more instructions, one or more instructions executable by one or more processors causes a base station to transmit configuration information on a control resource set (CORESET) of a first group and a CORESET of a second group to a UE, to transmit a first physical downlink control channel (PDCCH) to the UE in the CORESET of the first group, to transmit a first physical downlink shared channel (PDSCH) to the UE based on the first PDCCH, to transmit a second PDCCH to the UE in the CORESET of the second group, and to transmit a second PDSCH to the UE based on the second PDCCH, wherein at least one of the first PDSCH and the second PDSCH may be transmitted using a default CORESET upon scheduling thereof within a scheduling offset.

Example of Communication System to which the Present Disclosure is Applied

Although not limited thereto, but various descriptions, functions, procedures, proposals, methods, and/or operation flowcharts described in the present disclosure can be applied to various fields requiring wireless communication/connection (e.g., 5G) between devices.

Hereinafter, the communication system will be described in more detail with reference to drawings. In the following drawings/descriptions, the same reference numerals will refer to the same or corresponding hardware blocks, software blocks, or functional blocks, if not differently described.

FIG. 21 illustrates a communication system 10 applied to the present disclosure.

Referring to 21, a communication system 10 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 1000*a*, vehicles 1000*b*-1 and 1000*b*-2, an eXtended Reality (XR) device 1000*c*, a hand-held device 1000*d*, a home appliance 1000*e*, an Internet of Thing (IoT) device 1000*f*, and an AI device/server 4000. For example, the vehicle may include a vehicle with a wireless communication function, an autonomous vehicle, a vehicle capable of performing inter-vehicle communication, and the like.

Further, the vehicle may include an unmanned aerial vehicle (UAV) (e.g., drone). The XR device may include an augmented reality (AR)/virtual reality (VR)/mixed reality (MR) device and may be implemented as a head-mounted device (HMD), a head-up display (HUD) provided in the vehicle, a television, a smart phone, a computer, a wearable device, a home appliance device, digital signage, a vehicle, a robot, etc. The hand-held device may include a smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even as the wireless device, and a specific wireless device 2000a may operate as a base station/network node for other wireless devices.

The wireless devices 1000a to 1000f may be connected to a network 3000 over a base station 2000. An artificial intelligence (AI) technology may be applied to the wireless devices 1000a to 1000f, and the wireless devices 1000a to 1000f may be connected to the AI server 4000 over the network 3000. The network 3000 may be comprised using a 3G network, a 4G (e.g., LTE) network, or a 5G (e.g., NR) network. The wireless devices 1000a to 1000f may communicate with each other over the base station 2000/network 3000, but may directly communicate with each other without going through the base station/network (sidelink communication). For example, the vehicles 1000b-1 and 1000b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 1000a to 1000f.

Wireless communications/connections 1500a, 1500b, and 1500c may be made between the wireless devices 1000a to 1000f and the base station 2000 and between the base station 2000 and the base station 2000. The wireless communication/connection may be made through various wireless access technologies (e.g., 5G NR) such as uplink/downlink communication 1500a, sidelink communication 1500b (or D2D communication), and inter-base station communication 1500c (e.g., relay, integrated access backhaul (JAB)). The wireless device and the base station/the wireless device and the base station and the base station may transmit/receive radio signals to/from each other through wireless communications/connections 1500a, 1500b, and 1500c. For example, the wireless communications/connections 1500a, 1500b, and 1500c may transmit/receive signals on various physical channels. To this end, based on various descriptions of the present disclosure, at least some of various configuration information setting processes, various signal processing processes (e.g., channel encoding/decoding, modulation/demodulation, resource mapping/de-mapping, etc.), a resource allocation process, etc. for transmission/reception of the radio signal may be performed.

Example of Wireless Device to which the Present Disclosure is Applied

FIG. 22 illustrates a wireless device applicable to the present disclosure.

Referring to FIG. 22, a first wireless device 1000 and a second wireless device 2000 may transmit and receive radio signals through various wireless access technologies (e.g., LTE and NR). The first wireless device 1000 and the second wireless device 2000 may correspond to the wireless device 1000x and the base station 2000 and/or the wireless device 1000x and the wireless device 1000x of FIG. 21.

The first wireless device 1000 may include one or more processors 1020 and one or more memories 1040 and may further include one or more transceivers 1060 and/or one or more antennas 1080. The processor 1020 may control the memory 1040 and/or the transceiver 1060 and may be configured to implement descriptions, functions, procedures, proposals, methods, and/or operation flows described in the present disclosure. For example, the processor 1020 may process information in the memory 1040 and generate first information/signal and then transmit a radio signal including the first information/signal through the transceiver 1060. Further, the processor 1020 may receive a radio signal including second information/signal through the transceiver 1060 and then store in the memory 1040 information obtained from signal processing of the second information/signal. The memory 1040 may be connected to the processor 1020 and store various information related to an operation of the processor 1020. For example, the memory 1040 may store a software code including instructions for performing some or all of processes controlled by the processor 1020 or performing the descriptions, functions, procedures, proposals, methods, and/or operation flowcharts described in the present disclosure. The processor 1020 and the memory 1040 may be a part of a communication modem/circuit/chip designed to implement the wireless communication technology (e.g., LTE and NR). The transceiver 1060 may be connected to the processor 1020 and may transmit and/or receive the radio signals through one or more antennas 1080. The transceiver 1060 may include a transmitter and/or a receiver. The transceiver 1060 may be mixed with a radio frequency (RF) unit. In the present disclosure, the wireless device may mean the communication modem/circuit/chip.

The second wireless device 2000 may include one or more processors 2020 and one or more memories 2040 and may further include one or more transceivers 2060 and/or one or more antennas 2080. The processor 2020 may control the memory 2040 and/or the transceiver 2060 and may be configured to implement descriptions, functions, procedures, proposals, methods, and/or operation flows described in the present disclosure. For example, the processor 2020 may process information in the memory 2040 and generate third information/signal and then transmit a radio signal including the third information/signal through the transceiver 2060. Further, the processor 2020 may receive a radio signal including fourth information/signal through the transceiver 2060 and then store in the memory 2040 information obtained from signal processing of the fourth information/signal. The memory 2040 may be connected to the processor 2020 and store various information related to an operation of the processor 2020. For example, the memory 2040 may store a software code including instructions for performing some or all of processes controlled by the processor 2020 or performing the descriptions, functions, procedures, proposals, methods, and/or operation flowcharts described in the present disclosure. The processor 2020 and the memory 2040 may be a part of a communication modem/circuit/chip designated to implement the wireless communication technology (e.g., LTE and NR). The transceiver 2060 may be connected to the processor 2020 and may transmit and/or receive the radio signals through one or more antennas 2080. The transceiver 2060 may include a transmitter and/or a receiver, and the transceiver 2060 may be mixed with the RF unit. In the present disclosure, the wireless device may mean the communication modem/circuit/chip.

Hereinafter, hardware elements of the wireless devices 1000 and 2000 will be described in more detail. Although not limited thereto, one or more protocol layers may be implemented by one or more processors 1020 and 2020. For example, one or more processors 1020 and 2020 may implement one or more layers (e.g., functional layers such as PHY, MAC, RLC, PDCP, RRC, and SDAP). One or more processors 1020 and 2020 may generate one or more protocol data units (PDUs) and/or one or more service data units (SDUs) according to the descriptions, functions, procedures, proposals, methods, and/or operation flowcharts described in the present disclosure. One or more processors 1020 and 2020 may generate a message, control information, data, or information according to the descriptions, functions, procedures, proposals, methods, and/or operation flowcharts described in the present disclosure. One or more processors 1020 and 2020 may generate a signal (e.g., a baseband signal) including the PDU, the SDU, the message, the control information, the data, or the information according to the function, the procedure, the proposal, and/or the method described in the present disclosure and provide the generated signal to one or more transceivers 1060 and 2060. One or more processors 1020 and 2020 may receive the signal (e.g. baseband signal) from one or more transceivers 1060 and 2060 and acquire the PDU, the SDU, the message, the control information, the data, or the information according to the descriptions, functions, procedures, proposals, methods, and/or operation flowcharts described in the present disclosure.

One or more processors 1020 and 2020 may be referred to as a controller, a microcontroller, a microprocessor, or a microcomputer. One or more processors 1020 and 2020 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 1020 and 2020. The descriptions, functions, procedures, proposals, and/or operation flowcharts described in the present disclosure may be implemented by using firmware or software and the firmware or software may be implemented to include modules, procedures, functions, and the like. Firmware or software configured to perform the descriptions, functions, procedures, proposals, and/or operation flowcharts described in the present disclosure may be included in one or more processors 1020 and 2020 or stored in one or more memories 1040 and 2040 and driven by one or more processors 1020 and 2020. The descriptions, functions, procedures, proposals, and/or operation flowcharts described in the present disclosure may be implemented by using firmware or software in the form of a code, the instruction and/or a set form of the instruction.

One or more memories 1040 and 2040 may be connected to one or more processors 1020 and 2020 and may store various types of data, signals, messages, information, programs, codes, indications and/or instructions. One or more memories 1040 and 2040 may be comprised of a ROM, a RAM, an EPROM, a flash memory, a hard drive, a register, a cache memory, a computer reading storage medium and/or a combination thereof. One or more memories 1040 and 2040 may be positioned inside and/or outside one or more processors 1020 and 2020. Further, one or more memories 1040 and 2040 may be connected to one or more processors 1020 and 2020 through various technologies such as wired or wireless connection.

One or more transceivers 1060 and 2060 may transmit to one or more other devices user data, control information, a wireless signal/channel, etc., mentioned in the methods and/or operation flowcharts of the present disclosure. One or more transceivers 1060 and 2060 may receive from one or more other devices user data, control information, a wireless signal/channel, etc., mentioned in the descriptions, functions, procedures, proposals, methods, and/or operation flowcharts described in the present disclosure. For example, one or more transceivers 1060 and 2060 may be connected to one or more processors 1020 and 2020 and transmit and receive the radio signals. For example, one or more processors 1020 and 2020 may control one or more transceivers 1060 and 2060 to transmit the user data, the control information, or the radio signal to one or more other devices. Further, one or more processors 1020 and 2020 may control one or more transceivers 1060 and 2060 to receive the user data, the control information, or the radio signal from one or more other devices. Further, one or more transceivers 1060 and 2060 may be connected to one or more antennas 1080 and 2080, and one or more transceivers 1060 and 2060 may be configured to transmit and receive the user data, control information, wireless signal/channel, etc., mentioned in the descriptions, functions, procedures, proposals, methods, and/or operation flowcharts described in the present disclosure through one or more antennas 1080 and 2080. In the present disclosure, one or more antennas may be a plurality of physical antennas or a plurality of logical antennas (e.g., antenna ports). One or more transceivers 1060 and 2060 may convert the received radio signal/channel from an RF band signal into a baseband signal, in order to process the received user data, control information, radio signal/channel, etc., using one or more processors 1020 and 2020. One or more transceivers 1060 and 2060 may convert the user data, control information, radio signal/channel, etc., processed using one or more processors 1020 and 2020, from the baseband signal into the RF band signal. To this end, one or more transceivers 1060 and 2060 may include an (analog) oscillator and/or filter.

Example of Signal Processing Circuit to which the Present Disclosure is Applied

FIG. 23 illustrates a signal processing circuit for a transmission signal.

Referring to FIG. 23, a signal processing circuit 10000 may include a scrambler 10100, a modulator 10200, a layer mapper 10300, a precoder 10400, a resource mapper 10500, and a signal generator 10600. Although not limited thereto, an operation/function of FIG. 23 may be performed by the processors 1020 and 2020 and/or the transceivers 1060 and 2060 of FIG. 23. Hardware elements of FIG. 23 may be implemented in the processors 1020 and 2020 and/or the transceivers 1060 and 2060 of FIG. 22. For example, blocks 10100 to 10600 may be implemented in the processors 1020 and 2020 of FIG. 22. Further, blocks 10100 to 10500 may be implemented in the processors 1020 and 2020 of FIG. 22, and the block 10600 may be implemented in the transceivers 1060 and 2060 of FIG. 22.

A codeword may be transformed into a radio signal via the signal processing circuit 10000 of FIG. 23. The codeword is an encoded bit sequence of an information block. The information block may include transport blocks (e.g., a UL-SCH transport block, a DL-SCH transport block, etc.). The radio signal may be transmitted on various physical channels (e.g., PUSCH, PDSCH, etc).

Specifically, the codeword may be transformed into a bit sequence scrambled by the scrambler 10100. A scramble sequence used for scrambling may be generated based on an initialization value, and the initialization value may include ID information, etc. of a wireless device. The scrambled bit sequence may be modulated into a modulated symbol sequence by the modulator 10200. A modulation scheme may include pi/2-binary phase shift keying (BPSK), m-phase shift keying (PSK), m-quadrature amplitude modulation (QAM), etc. A complex modulated symbol sequence may be mapped to one or more transport layers by the layer mapper 10300. Modulated symbols of each transport layer may be mapped to a corresponding antenna port(s) by the precoder 10400 (precoding). An output z of the precoder 10400 may be obtained by multiplying an output y of the layer mapper 10300 by a precoding matrix W of N*M, where N is the number of antenna ports, and M is the number of transport layers. The precoder 10400 may perform precoding after performing transform precoding (e.g., DFT transform) on complex modulated symbols. Further, the precoder 10400 may perform the precoding without performing the transform precoding.

The resource mapper 10500 may map the modulated symbols of each antenna port to time-frequency resources. The time-frequency resources may include a plurality of symbols (e.g., CP-OFDMA symbol and DFT-s-OFDMA symbol) in a time domain and include a plurality of subcarriers in a frequency domain. The signal generator 10600 may generate the radio signal from the mapped modulated symbols, and the generated radio signal may be transmitted to another device over each antenna. To this end, the signal generator 10600 may include an inverse fast Fourier transform (IFFT) module, a cyclic prefix (CP) insertor, a digital-to-analog converter (DAC), a frequency uplink converter, and the like.

A signal processing process for a received signal in the wireless device may be configured in the reverse of the signal processing processes 10100 to 10600 of FIG. 23. For example, the wireless device (e.g., 1000 and 2000 of FIG. 22) may receive the radio signal from the outside through the antenna port/transceiver. The received radio signal may be converted into a baseband signal through a signal reconstructor. To this end, the signal reconstructor may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which the Present Disclosure is Applied FIG. 24 illustrates another example of a wireless device applied to the present disclosure.

The wireless device may be implemented in various types of devices according to usage examples/services. Referring to FIG. 24, wireless devices 1000 and 2000 may correspond to the wireless devices 1000 and 2000 of FIG. 22 and may be comprised of various elements, components, units, and/or modules. For example, the wireless devices 1000 and 2000 may include a communication unit 1100, a control unit 1200, and a memory unit 1300, and an additional element 1400. The communication unit 1100 may include a communication circuit 1120 and a transceiver(s) 1140. For example, the communication circuit 1120 may include one or more processors 1020 and 2020 and/or one or more memories 1040 and 2040 of FIG. 22. For example, the transceiver(s) 1140 may include one or more transceivers 1060 and 2060 and/or one or more antennas 1080 and 2080 of FIG. 22. The control unit 1200 is electrically connected to the communication unit 1100, the memory unit 1300, and the additional element 1400 and controls an overall operation of the wireless device. For example, the control unit 1200 may an electrical/mechanical operation of the wireless device based on a program/code/instruction/information stored in the memory unit 1300. Further, the control unit 1200 may transmit the information stored in the memory unit 1300 to the outside (e.g., other communication devices) through the communication unit 1100 via a wireless/wired interface, or store information received from the outside (e.g., other communication devices) via the wireless/wired interface through the communication unit 1100.

The additional element 1400 may be variously configured according to the type of wireless device. For example, the additional element 1400 may include at least one of a power unit/battery, an input/output (I/O) unit, a driving unit, and a computing unit. Although not limited thereto, the wireless device may be implemented as a form such as the robot 1000*a* of FIG. 21, the vehicles 1000*b*-1 and 1000*b*-2 of FIG. 21, the XR device 1000*c* of FIG. 21, the portable device 1000*d* of FIG. 21, the home appliance 1000*e* of FIG. 21, the IoT device 1000*f* of FIG. 21, a digital broadcasting terminal, a hologram device, a public safety device, an MTC device, a medical device, a FinTech device (or financial device), a security device, a climate/environment device, an AI server/device 4000 of FIG. 21, the base station 2000 of FIG. 21, a network node, etc. The wireless device may be movable or may be used at a fixed place according to use examples/services.

In FIG. 24, all of various elements, components, units, and/or modules in the wireless devices 1000 and 2000 may be interconnected via the wired interface or at least may be wirelessly connected through the communication unit 1100. For example, the control unit 1200 and the communication 1100 in the wireless devices 1000 and 2000 may be wiredly connected and the control unit 1200 and the first unit (e.g., 1300 or 1400) may be wirelessly connected through the communication unit 1100. Further, each element, component, unit, and/or module in the wireless devices 1000 and 2000 may further include one or more elements. For example, the control unit 1200 may be constituted by one or more processor sets. For example, the control unit 1200 may be configured a set of a communication control processor, an application processor, an electronic control unit (ECU), a graphic processing processor, a memory control processor, etc. As another example, the memory unit 1300 may be configured as a random access memory (RAM), a dynamic RAM (DRAM), a read only memory (ROM), a flash memory, a volatile memory, a non-volatile memory, and/or combinations thereof.

FIG. 25 illustrates a portable device applied to the present disclosure.

The portable device may include a smart phone, a smart pad, a wearable device (e.g., a smart watch, a smart glass), and a portable computer (e.g., a notebook, etc.). The portable device may be referred to as a mobile station (MS), a user terminal (UT), a mobile subscriber station (MSS), a subscriber station (SS), an advanced mobile station (AMS), or a wireless terminal (WT).

Referring to FIG. 25, a portable device 1000 may include an antenna unit 1080, a communication unit 1100, a control unit 1200, a memory unit 1300, a power supply unit 1400*a*, an interface unit 1400*b*, and an input/output unit 1400*c*. The antenna unit 1080 may be configured as a part of the communication unit 1100. The blocks 1100 to 1300/1400a to 1400c correspond to the blocks 1100 to 1300/1400 of FIG. 24, respectively.

The communication unit 1100 may transmit/receive a signal (e.g., data, a control signal, etc.) to/from other wireless devices and base stations. The control unit 1200 may perform various operations by controlling components of the portable device 1000. The control unit 1200 may include an application processor (AP). The memory unit 1300 may store data/parameters/programs/codes/instructions required for driving the portable device 1000. Further, the memory unit 1300 may store input/output data/information, etc. The power supply unit 1400a may supply power to the portable device 1000 and include a wired/wireless charging circuit, a battery, and the like. The interface unit 1400b may support a connection between the portable device 1000 and another external device. The interface unit 1400b may include various ports (e.g., an audio input/output port, a video input/output port) for the connection with the external device. The input/output unit 1400c may receive or output a video information/signal, an audio information/signal, data, and/or information input from a user. The input/output unit 1400c may include a camera, a microphone, a user input unit, a display 1400d, a speaker, and/or a haptic module.

For example, in the case of data communication, the input/output unit 1400c may acquire information/signal (e.g., touch, text, voice, image, video, etc.) input from the user, and the acquired information/signal may be stored in the memory unit 1300. The communication unit 1100 may transform the information/signal stored in the memory into the radio signal and directly transmit the radio signal to another wireless device or transmit the radio signal to the base station. Further, the communication unit 1100 may receive the radio signal from another wireless device or base station and then reconstruct the received radio signal into original information/signal. The reconstructed information/signal may be stored in the memory unit 1300 and then output in various forms (e.g., text, voice, image, video, haptic) through the input/output unit 1400c.

Here, the wireless communication technology implemented in the wireless devices (e.g., 1000, 2000, and 1000a to 1000f) of the present disclosure may include narrowband Internet of Things for low-power communication as well as LTE, NR, and 6G. For example, NB-IoT technology may be an example of LPWAN (Low Power Wide Area Network) technology and may be implemented in standards such as LTE Cat NB1 and/or LTE Cat NB2, but it is limited to the above-mentioned names. Additionally or alternatively, the wireless communication technology implemented in wireless devices (e.g., 1000, 2000, and 1000a to 1000f) of the present disclosure may perform communication based on LTE-M technology. In this case, as an example, LTE-M technology may be an example of LPWAN technology and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and 7) LTE M, and is not limited to the above-described name. Additionally or alternatively, the wireless communication technology implemented in wireless devices (e.g., 1000, 2000, and 1000a to 1000f) of the present disclosure may include at least one of ZigBee, Bluetooth, and Low Power Wide Area Network (LPWAN) in consideration of low power communication, but is not limited thereto. For example, the ZigBee technology can create personal area networks (PANs) related to small/low-power digital communication based on various standards such as IEEE 802.15.4, and can be called by various names.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the methods of transmitting and receiving a PDSCH in a wireless communication system according to the present disclosure have been described focusing on examples in which the methods are applied to 3GPP LTE/LTE-A and 5G (New RAT), the methods can be applied to various other wireless communication systems.

The invention claimed is:

1. A method comprising:
receiving, by a user equipment (UE), configuration information for first control resources of a first group and second control resources of a second group;
receiving, by the UE, a first downlink control channel for scheduling a first downlink shared channel in the first control resources of the first group;

receiving, by the UE, the first downlink shared channel based on the first downlink control channel;
receiving, by the UE, a second downlink control channel for scheduling a second downlink shared channel in the second control resources of the second group;
receiving, by the UE, the second downlink shared channel based on the second downlink control channel,
wherein the first downlink control channel or the second downlink control channel is configured to schedule the first downlink shared channel or the second downlink shared channel within or after a scheduling offset based on whether the first control resources of the first group or the second control resources of the second group include default control resources or not,
wherein, responsive to determining that the first control resources of the first group or the second control resources of the second group include the default control resources and the first downlink shared channel or the second downlink shared channel is scheduled within the scheduling offset, the first downlink shared channel or the second downlink shared channel is received using the default control resources,
wherein, responsive to determining that the first control resources of the first group or the second control resources of the second group do not include the default control resources and the first downlink shared channel or the second downlink shared channel is scheduled within the scheduling offset, the first downlink control channel or the second downlink control channel is ignored and processed as an error;
receiving, by the UE, configuration related to channel state information;
receiving, by the UE, channel state information related reference signal based on the configuration related to the channel state information;
generating, by the UE, the channel state information to report based on the channel state information related reference signal;
transmitting, by the UE to a base station, the channel state information; and
reporting, by the UE to the base station, information for a group using the default control resources between the first group and the second group.

2. The method of claim 1, wherein the first downlink shared channel or the second downlink shared channel is received using a spatial quasi-co-location (QCL) reference signal of the default control resources.

3. The method of claim 1, wherein information related to a spatial quasi-co-location (QCL) reference signal of the first downlink shared channel or the second downlink shared channel is included in the first downlink control channel or the second downlink control channel.

4. The method of claim 1, wherein the first downlink shared channel is received in a resource scheduled by the first downlink control channel, and the second downlink shared channel is received in a resource scheduled by the second downlink control channel.

5. The method of claim 1, wherein the first downlink control channel is received using a spatial quasi-co-location (QCL) reference signal of the first control resources of the first group, and the second downlink control channel is received using a spatial QCL reference signal of the second control resources of the second group.

6. The method of claim 1, wherein the first downlink control channel and the first downlink shared channel are received based on a different transmission and reception point (TRP), panel, beam, or spatial quasi-co-location (QCL) reference signal from that for the second downlink control channel and the second downlink shared channel.

7. The method of claim 1, wherein the UE simultaneously supports a plurality of beams or a plurality of spatial quasi-co-location (QCL) reference signals.

8. A user equipment (UE) comprising:
at least one transceiver;
at least one processor; and
at least one memory operably connectable to the at least one processor and storing instructions that, based on being executed by the at least one processor, perform operations comprising:
receiving, by the UE, configuration information for first control resources of a first group and second control resources of a second group;
receiving, by the UE, a first downlink control channel for scheduling a first downlink shared channel in the first control resources of the first group;
receiving, by the UE, the first downlink shared channel based on the first downlink control channel;
receiving, by the UE, a second downlink control channel for scheduling a second downlink shared channel in the second control resources of the second group;
receiving, by the UE, the second downlink shared channel based on the second downlink control channel,
wherein the first downlink control channel or the second downlink control channel is configured to schedule the first downlink shared channel or the second downlink shared channel within or after a scheduling offset based on whether the first control resources of the first group or the second control resources of the second group include default control resources or not,
wherein, responsive to determining that the first control resources of the first group or the second control resources of the second group include the default control resources and the first downlink shared channel or the second downlink shared channel is scheduled within the scheduling offset, the first downlink shared channel or the second downlink shared channel is received using the default control resources,
wherein, responsive to determining that the first control resources of the first group or the second control resources of the second group do not include the default control resources and the first downlink shared channel or the second downlink shared channel is scheduled within the scheduling offset, the first downlink control channel or the second downlink control channel is ignored and processed as an error;
receiving, by the UE, configuration related to channel state information;
receiving, by the UE, channel state information related reference signal based on the configuration related to the channel state information;
generating, by the UE, the channel state information to report based on the channel state information related reference signal;
transmitting, by the UE to a base station, the channel state information; and
reporting, by the UE to the base station, information for a group using the default control resources between the first group and the second group.

9. The UE of claim 8, wherein the first downlink shared channel or the second downlink shared channel is received using a spatial quasi-co-location (QCL) reference signal of the default control resources.

10. The UE of claim 8, wherein information related to a spatial quasi-co-location (QCL) reference signal of the first downlink shared channel or the second downlink shared channel is included in the first downlink control channel or the second downlink control channel.

11. The UE of claim 8, wherein the first downlink shared channel is received in a resource scheduled by the first downlink control channel, and the second downlink shared channel is received in a resource scheduled by the second downlink control channel.

12. The UE of claim 8, wherein the first downlink control channel is received using a spatial quasi-co-location (QCL) reference signal of the first control resources of the first group, and the second downlink control channel is received using a spatial QCL reference signal of the second control resources of the second group.

13. The UE of claim 8, wherein the first downlink control channel and the first downlink shared channel are received based on a different transmission and reception point (TRP), panel, beam, or spatial quasi-co-location (QCL) reference signal from that for the second downlink control channel and the second downlink shared channel.

14. The UE of claim 8, wherein the UE simultaneously supports a plurality of beams or a plurality of spatial quasi-co-location (QCL) reference signals.

15. A base station (BS) comprising:
   at least one transceiver;
   at least one processor; and
   at least one memory operably connectable to the at least one processor and storing instructions that, based on being executed by the at least one processor, perform operations comprising:
   transmitting, by the BS, configuration information for first control resources of a first group and second control resources of a second group to a UE;
   transmitting, by the BS, a first downlink control channel for scheduling a first downlink shared channel to the UE in the first control resources of the first group;
   transmitting, by the BS, the first downlink shared channel to the UE based on the first control channel;
   transmitting, by the BS, a second control channel for scheduling a second downlink shared channel to the UE in the second control resources of the second group;
   transmitting, by the BS, the second downlink shared channel based on the second downlink control channel,
   wherein the first downlink control channel or the second downlink control channel is configured to schedule the first downlink shared channel or the second downlink shared channel within or after a scheduling offset based on whether the first control resources of the first group or the second control resources of the second group include default control resources or not,
   wherein, responsive to determining that the first control resources of the first group or the second control resources of the second group include the default control resources and the first downlink shared channel or the second downlink shared channel is scheduled within the scheduling offset, the first downlink shared channel or the second downlink shared channel is transmitted using the default control resources,
   wherein, responsive to determining that the first control resources of the first group or the second control resources of the second group do not include the default control resources and the first downlink shared channel or the second downlink shared channel is scheduled within the scheduling offset, the first downlink control channel or the second downlink control channel is ignored and processed as an error;
   transmitting, by the BS, configuration related to channel state information;
   transmitting, by the BS, channel state information related reference signal based on the configuration related to the channel state information;
   receiving, by the BS from the UE, the channel state information based on the channel state information related reference signal; and
   receiving, by the BS from the UE, information for a group using the default control resources between the first group and the second group.

* * * * *